(12) United States Patent
Misra et al.

(10) Patent No.: US 11,206,461 B2
(45) Date of Patent: Dec. 21, 2021

(54) SYSTEMS AND METHODS FOR COMMUNICATING USER SETTINGS IN CONJUNCTION WITH EXECUTION OF AN APPLICATION

(71) Applicant: Sharp Kabushiki Kaisha, Sakai (JP)

(72) Inventors: Kiran Mukesh Misra, Camas, WA (US); Sachin G. Deshpande, Camas, WA (US); Sheau Ng, Camas, WA (US)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 16/311,717

(22) PCT Filed: May 23, 2017

(86) PCT No.: PCT/JP2017/019258
§ 371 (c)(1),
(2) Date: Dec. 20, 2018

(87) PCT Pub. No.: WO2018/008273
PCT Pub. Date: Jan. 11, 2018

(65) Prior Publication Data
US 2019/0200099 A1   Jun. 27, 2019

Related U.S. Application Data

(60) Provisional application No. 62/358,522, filed on Jul. 5, 2016, provisional application No. 62/376,314, filed on Aug. 17, 2016.

(51) Int. Cl.
*H04H 60/32* (2008.01)
*H04N 21/81* (2011.01)
(Continued)

(52) U.S. Cl.
CPC ....... *H04N 21/8173* (2013.01); *H04N 21/435* (2013.01); *H04N 21/442* (2013.01);
(Continued)

(58) Field of Classification Search
CPC ........... H04N 21/8173; H04N 21/4882; H04N 21/814; H04N 21/4532; H04N 21/44213;
(Continued)

(56) References Cited

U.S. PATENT DOCUMENTS 6,504,990 B1 * 1/2003 Abecassis .............. G11B 19/02
348/E5.105
8,832,731 B1    9/2014 Sennett et al.
(Continued)

FOREIGN PATENT DOCUMENTS

WO    2015/088217 A1    6/2015
WO    2015/119455 A1    8/2015

OTHER PUBLICATIONS

"ATSC Candidate Standard: Signaling, Deliver, Synchronization, and Error Protection (A/331)"; Advanced Television Systems Committee; Doc S33-1-500r5; Jan. 14, 2016; 139 pages.
(Continued)

*Primary Examiner* — Jefferey F Harold
*Assistant Examiner* — Sahar Aqil Riaz
(74) *Attorney, Agent, or Firm* — Keating & Bennett, LLP

(57) ABSTRACT

A device may be configured to cause application based features corresponding to a service provided by a service provider to execute based on one or more determined user settings.

12 Claims, 6 Drawing Sheets

(51) Int. Cl.
| | |
|---|---|
| *H04N 21/442* | (2011.01) |
| *H04N 21/435* | (2011.01) |
| *H04N 21/485* | (2011.01) |
| *H04N 21/475* | (2011.01) |
| *H04N 21/45* | (2011.01) |
| *H04N 21/488* | (2011.01) |
| *H04N 21/84* | (2011.01) |
| *H04L 29/08* | (2006.01) |

(52) U.S. Cl.
CPC ... *H04N 21/44213* (2013.01); *H04N 21/4532* (2013.01); *H04N 21/4755* (2013.01); *H04N 21/485* (2013.01); *H04N 21/4882* (2013.01); *H04N 21/814* (2013.01); *H04N 21/8166* (2013.01); *H04N 21/84* (2013.01); *H04L 67/306* (2013.01)

(58) Field of Classification Search
CPC .... H04N 21/84; H04N 21/442; H04N 21/435; H04N 21/485; H04N 21/8166; H04N 21/4755; H04L 67/306
USPC .......................................................... 725/16
See application file for complete search history.

(56) References Cited

U.S. PATENT DOCUMENTS

| | | | | |
|---|---|---|---|---|
| 9,571,870 | B1* | 2/2017 | Wilson | G10L 15/005 |
| 2007/0172199 | A1* | 7/2007 | Kobayashi | G11B 27/105 |
| | | | | 386/241 |
| 2011/0289419 | A1* | 11/2011 | Yu | H04N 21/485 |
| | | | | 715/738 |
| 2012/0166655 | A1* | 6/2012 | Maddali | G06F 9/547 |
| | | | | 709/228 |
| 2013/0205337 | A1* | 8/2013 | McClenny | H04H 20/63 |
| | | | | 725/33 |
| 2014/0055272 | A1* | 2/2014 | McCormick | G01W 1/10 |
| | | | | 340/601 |
| 2014/0148132 | A1* | 5/2014 | Pelttari | H04M 3/533 |
| | | | | 455/412.1 |
| 2015/0012952 | A1 | 1/2015 | Sato et al. | |
| 2015/0235540 | A1* | 8/2015 | Verna | H04L 67/26 |
| | | | | 340/539.11 |
| 2016/0087736 | A1 | 3/2016 | Murakami et al. | |
| 2016/0105707 | A1* | 4/2016 | Chen | H04N 21/4884 |
| | | | | 725/25 |
| 2016/0182924 | A1* | 6/2016 | Todd | H04N 5/45 |
| | | | | 725/116 |
| 2016/0217132 | A1* | 7/2016 | Jing | G06F 16/95 |
| 2016/0269786 | A1* | 9/2016 | Lee | H04N 21/4758 |
| 2016/0360269 | A1* | 12/2016 | An | H04N 21/462 |
| 2017/0171640 | A1* | 6/2017 | Shintani | H04N 21/2353 |
| 2019/0266871 | A1* | 8/2019 | Verna | H04L 67/12 |

OTHER PUBLICATIONS

Crockford, D.; "The Application/Json Media Type for JavaScript Object Notation (JSON)"; Request for Comments (RFC): 4627; Network Working Group, Jul. 2006; pp. 1-10.

"ATSC Candidate Standard: Content Recovery in Redistribution Scenarios (A/336)"; Advanced Television Systems Committee; Doc S33-178r2; Jan. 15, 2016; 43 pages.

Fette, I. et al.; "The WebSocket Protocol"; Request for Comments (RFC): 6455; Internet Engineering Task Force (IETF), Dec. 2011; pp. 1-71.

Hickson, I.; "The WebSocket Api"; W3C Candidate Recommendation; Sep. 20, 2012; 22 pages.

"JSON-RPC 2.0 Specification"; Mar. 26, 2010; Updated Jan. 4, 2013; 19 pages.

Phillips, A. et al.; "Tags for Identifying Languages"; Network Working Group; Request for Comments: 5646; Sep. 2009; pp. 1-84.

* cited by examiner

FIG. 1

SYSTEMS AND METHODS FOR COMMUNICATING USER SETTINGS IN CONJUNCTION WITH EXECUTION OF AN APPLICATION

TECHNICAL FIELD

The present disclosure relates to the field of interactive television.

BACKGROUND ART

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular phones, including so-called "smart" phones, dedicated video streaming devices, and the like. Digital media content (e.g., video and audio programming) may originate from a plurality of sources including, for example, over-the-air television providers, satellite television providers, cable television providers, online media service providers, including, so-called streaming service providers, and the like. Digital media content may be delivered over packet-switched networks, including bidirectional networks, such as Internet Protocol (IP) networks and unidirectional networks, such as digital broadcast networks.

Digital media content may be transmitted from a source to a receiver device (e.g., a digital television or a smart phone) according to a transmission standard. Examples of transmission standards include Digital Video Broadcasting (DVB) standards, Integrated Services Digital Broadcasting Standards (ISDB) standards, and standards developed by the Advanced Television Systems Committee (ATSC), including, for example, the ATSC 2.0 standard. The ATSC is currently developing the so-called ATSC 3.0 suite of standards. The ATSC 3.0 suite of standards seek to support a wide range of diverse services through diverse delivery mechanisms. For example, the ATSC 3.0 suite of standards seeks to support broadcast multimedia delivery, so-called broadcast streaming and/or file download multimedia delivery, so-called broadband streaming and/or file download multimedia delivery, and combinations thereof (i.e., "hybrid services"). An example of a hybrid service contemplated for the ATSC 3.0 suite of standards includes a receiver device receiving an over-the-air video broadcast (e.g., through a unidirectional transport) and receiving a synchronized secondary audio presentation (e.g., a secondary language) from an online media service provider through a packet network (i.e., through a bidirectional transport).

SUMMARY OF INVENTION

In general, this disclosure describes techniques for communication of user settings in conjunction with the execution of a service provider application. User settings may include, for example, language preferences (e.g., English, French, Spanish, etc.), content rating preferences (e.g., blocking of mature content, etc.), accessibility settings (e.g., settings to assist visually or hearing impaired users), video settings, audio settings, and the like. For example, a user may activate a setting through a user interface of a receiver device that causes an audio description of a television program to be rendered. It should be noted that in some cases a user setting may include a setting that is stored as part of a user profile (e.g., a language preference) and/or a setting that is enabled and/or disabled by a user during the operation of a receiver device (e.g., enabling and/or disabling close captioning). A service provider application may include an application-based feature that is intended to execute in conjunction with the presentation of multimedia content (e.g., a television program). For example, a service provider may distribute an application that causes real-time statistics to be displayed during the presentation of a live sporting event. In some instances, the execution of a service provider application may be based on one or more user settings. For example, a service provider application may be configured to provide information (e.g., a news story) according to a user's preferred language setting. It should be noted that execution of a service provider application based on one or more user settings may include changing the way information and/or an application is rendered, terminating an application, and/or causing an application not to launch. For example, if a service provider application is determined to be inappropriate for a user based on user content rating preferences, a receiver device may cause the service provider application to not be launched. It should be noted that although in some examples the techniques of this disclosure are described with respect to ATSC standards, the techniques described herein are generally applicable to any transmission standard. For example, the techniques described herein are generally applicable to any of DVB standards, ISDB standards, ATSC Standards, Digital Terrestrial Multimedia Broadcast (DTMB) standards, Digital Multimedia Broadcast (DMB) standards, Hybrid Broadcast and Broadband Television (HbbTV) standards, World Wide Web Consortium (W3C) standards, Universal Plug and Play (UPnP) standards, and other video encoding standards. Further, it should be noted that incorporation by reference of documents herein is for descriptive purposes and should not be constructed to limit and/or create ambiguity with respect to terms used herein. For example, in the case where one incorporated reference provides a different definition of a term than another incorporated reference and/or as the term is used herein, the term should be interpreted in a manner that broadly includes each respective definition and/or in a manner that includes each of the particular definitions in the alternative.

According to one example of the disclosure, a method for causing execution of an application based on one or more user settings comprises determining one or more user settings, and causing the received application to execute based on one or more determined user settings.

According to another example of the disclosure, a device for executing an application based on one or more user settings comprises one or more processors configured to determine one or more user settings and cause application based features corresponding to a service provided by a service provider to execute based on one or more determined user settings.

According to another example of the disclosure, an apparatus comprises means for determining one or more user settings, and means for causing the received application to execute based on one or more determined user settings.

According to another example of the disclosure, a non-transitory computer-readable storage medium comprises instructions stored thereon that upon execution cause one or more processors of a device to determine one or more user settings and cause application based features corresponding to a service provided by a service provider to execute based on one or more determined user settings.

The details of one or more examples are set forth in the accompanying drawings and the description below. Other features, objects, and advantages will be apparent from the description and drawings, and from the claims.

BRIEF DESCRIPTION OF DRAWINGS

FIG. 1 is a conceptual diagram illustrating an example of a content delivery protocol model according to one or more techniques of this disclosure.

DESCRIPTION OF EMBODIMENTS

Figure 1:
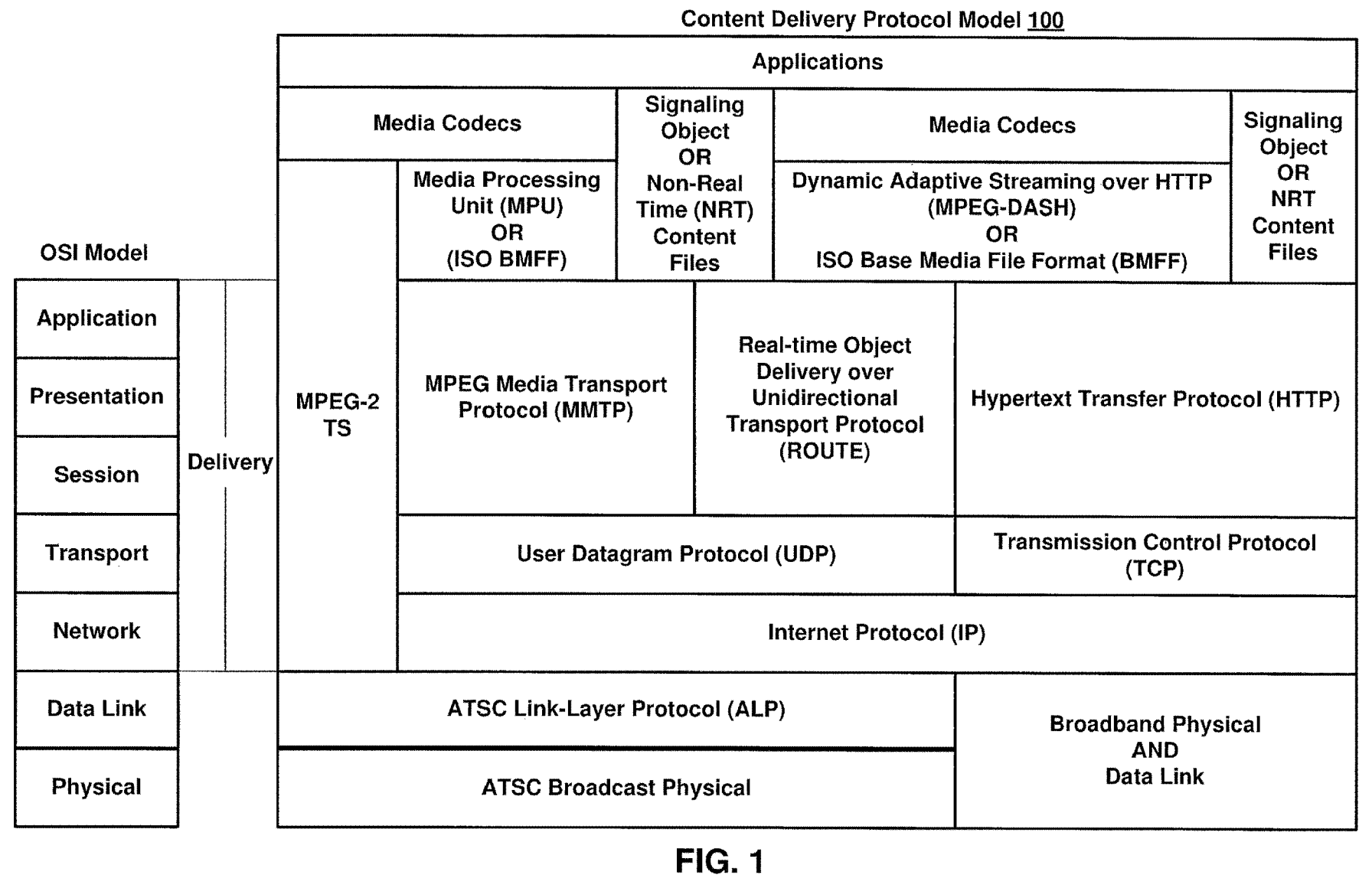
Figure 2:
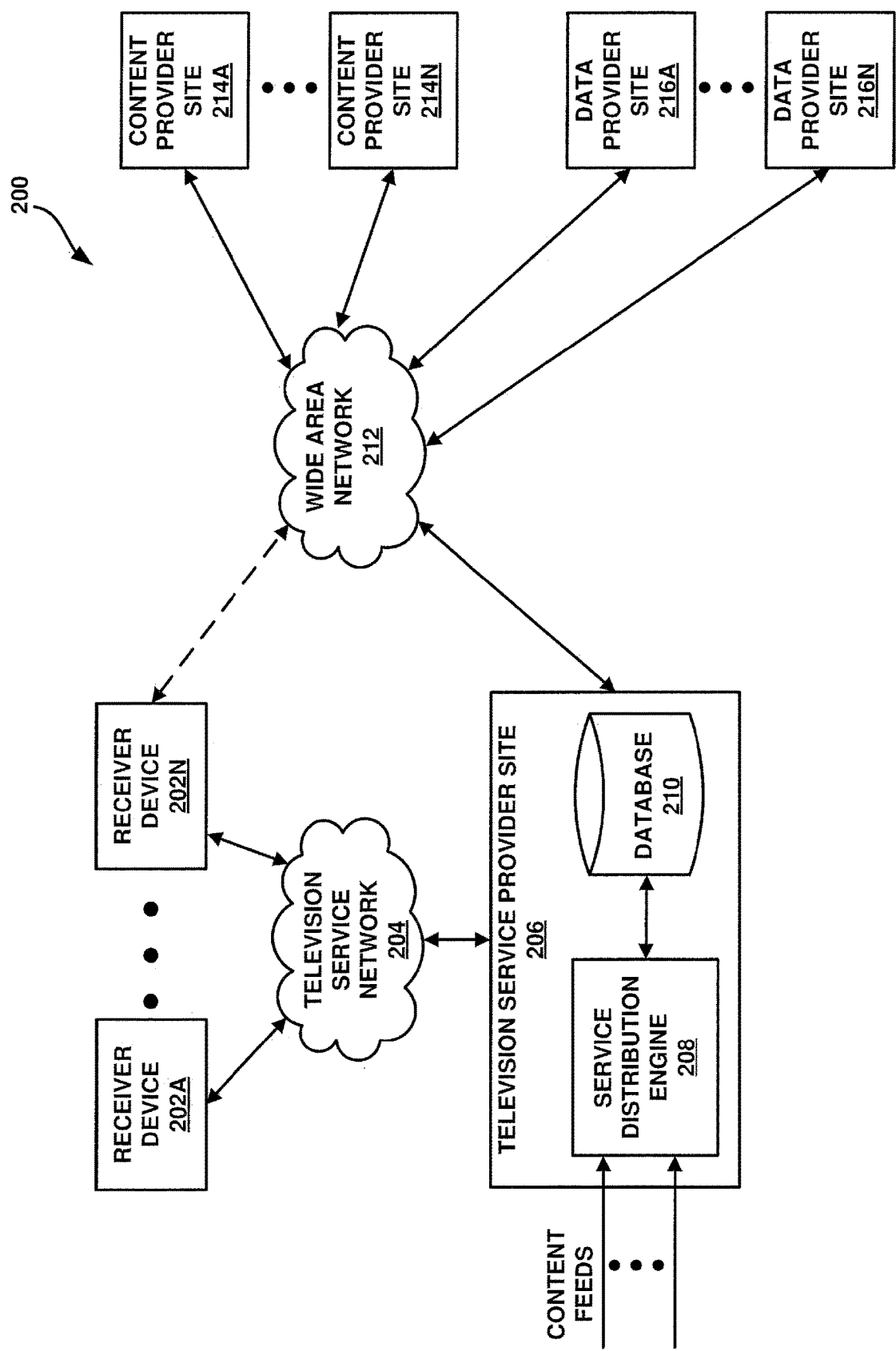
FIG. 2 is a block diagram illustrating an example of a system that may implement one or more techniques of this disclosure.

Computing devices and/or transmission systems may be based on models including one or more abstraction layers, where data at each abstraction layer is represented according to particular structures, e.g., packet structures, modulation schemes, etc. An example of a model including defined abstraction layers is the so-called Open Systems Interconnection (OSI) model illustrated in FIG. 1. The OSI model defines a 7-layer stack model, including an application layer, a presentation layer, a session layer, a transport layer, a network layer, a data link layer, and a physical layer. It should be noted that the use of the terms upper and lower with respect to describing the layers in a stack model may be based on the application layer being the uppermost layer and the physical layer being the lowermost layer. Further, in some cases, the term "Layer 1" or "L" may be used to refer to a physical layer, the term "Layer 2" or "L2" may be used to refer to a link layer, and the term "Layer 3" or "L3" or "IP layer" may be used to refer to the network layer.

A physical layer may generally refer to a layer at which electrical signals form digital data. For example, a physical layer may refer to a layer that defines how modulated radio frequency (RF) symbols form a frame of digital data. A data link layer, which may also be referred to as a link layer, may refer to an abstraction used prior to physical layer processing at a sending side and after physical layer reception at a receiving side. As used herein, a link layer may refer to an abstraction used to transport data from a network layer to a physical layer at a sending side and used to transport data from a physical layer to a network layer at a receiving side. It should be noted that a sending side and a receiving side are logical roles and a single device may operate as both a sending side in one instance and as a receiving side in another instance. A link layer may abstract various types of data (e.g., video, audio, or application files) encapsulated in particular packet types (e.g., Motion Picture Expert Group-Transport Stream (MPEG-TS) packets, Internet Protocol Version 4 (IPv4) packets, etc.) into a single generic format for processing by a physical layer. A network layer may generally refer to a layer at which logical addressing occurs. That is, a network layer may generally provide addressing information (e.g., Internet Protocol (IP) addresses) such that data packets can be delivered to a particular node (e.g., a computing device) within a network. As used herein, the term network layer may refer to a layer above a link layer and/or a layer having data in a structure such that it may be received for link layer processing. Each of a transport layer, a session layer, a presentation layer, and an application layer may define how data is delivered for use by a user application.

Transmission standards, including transmission standards currently under development, may include a content delivery protocol model specifying supported protocols for each layer and may further define one or more specific layer implementations. Referring again to FIG. 1, an example content delivery protocol model is illustrated. In the example illustrated in FIG. 1, content delivery protocol model 100 is "aligned" with the 7-layer OSI model for illustration purposes. It should be noted that such an illustration should not be construed to limit implementations of the content delivery protocol model 100 or the techniques described herein. Content delivery protocol model 100 may generally correspond to the currently proposed content delivery protocol model for the ATSC 3.0 suite of standards. Further, the techniques described herein may be implemented in a system configured to operate based on content delivery protocol model 100.

The ATSC 3.0 suite of standards includes aspects that have been approved for a compatible system implementation. For example, the ATSC 3.0 suite of standards includes an approved unidirectional physical layer implementation. Further, aspects of the ATSC 3.0 suite of standards currently under development are described in Candidate Standards, revisions thereto, and Working Drafts (WD), each of which may include proposed aspects for inclusion in a published (i.e., "final" or "adopted") version of an ATSC 3.0 standard. The approved ATSC 3.0 unidirectional physical layer includes a physical layer frame structure including a defined bootstrap, preamble, and data payload structure including one or more physical layer pipes (PLPs). A PLP may generally refer to a logical structure within an RF channel or a portion of an RF channel. That is, a PLP may include a portion of an RF channel having particular modulation and coding parameters. The proposed ATSC 3.0 unidirectional physical layer provides that a single RF channel can contain one or more PLPs and each PLP may carry one or more services. In one example, multiple PLPs may carry a single service.

In the proposed ATSC 3.0 suite of standards, the term service may be used to refer to a collection of media components presented to the user in aggregate (e.g., a video component, an audio component, and a sub-title component), where components may be of multiple media types, where a service can be either continuous or intermittent, where a service can be a real time service (e.g., multimedia presentation corresponding to a live event) or a non-real time service (e.g., a video on demand service, an electronic service guide service, etc.), and where a real time service may include a sequence of television programs. It should be noted that the proposed ATSC 3.0 suite of standards specifies that new types of services may be defined in future versions. Thus, as used herein the term service may refer to a service described with respect to the proposed ATSC 3.0 suite of standards and/or other types of digital media services. Further, it should be noted that the proposed ATSC 3.0 suite of standards supports services including application based features. In some examples, a service including application based features may be referred to as an application-based service. Application based features may include features presented on a primary display device and/or a companion device (i.e., so-called second screen applications) that supplement a multimedia presentation. For example, an application based feature may enable a user to cause real-time statistics to be displayed during the presentation of a live sporting event. Application based features may include service components including an application, optional files to be used by the application, and optional notifications directing the application to take particular actions at particular times. In one example, an application may be a collection of documents constituting an enhanced or interactive service. In one example, the documents of an application may include Hypertext Markup Language (HTML) pages, JavaScript, Cascading Style Sheets (CSS), eXtensible Markup Language (XML), and/or multimedia files. As described in further detail below, in one example, a browser of a receiver device may cause documents of an application to be executed in conjunction with the presentation of a multimedia service. It should be noted that as used herein the term service provider application may be used to refer application based features provided in conjunction a multimedia presentation service.

Referring to FIG. 1, content delivery protocol model 100 supports streaming and/or file download through a broadband physical layer and through the ATSC Broadcast Physical layer using MPEG Media Transport Protocol (MMTP) over User Datagram Protocol (UDP) and Internet Protocol (IP) and Real-time Object delivery over Unidirectional Transport (ROUTE) over UDP and IP. An overview of ROUTE is provided in ATSC Candidate Standard: Signaling, Delivery, Synchronization, and Error Protection (A/331) Doc. 533-1-500r5, 14 Jan. 2016, Rev. 7, 1 Jun. 2016 (hereinafter "A/331"), which is incorporated by reference in its entirety. It should be noted that although ATSC 3.0 uses the term broadcast to refer to a unidirectional over-the-air transmission physical layer, the so-called ATSC 3.0 broadcast physical layer supports video delivery through streaming or file download. As such, the term broadcast should not be used to limit the manner in which video and associated data may be transported according to one or more techniques of this disclosure. As described above, documents of an application may include HTML pages, JavaScript, CSS, XML, and/or multimedia files. Thus, in the case of ATSC 3.0, documents of an application may be delivered to a receiver device using a combination of broadband physical layers and/or an ATSC 3.0 broadcast physical layer. In one example, a collection of files forming a service provider application may be packaged as one compressed file and downloaded by a receiver device via the ATSC 3.0 broadcast physical layer utilizing ROUTE.

FIG. 2 is a block diagram illustrating an example of a system that may implement one or more techniques described in this disclosure. System 200 may be configured to communicate data in accordance with the techniques described herein. In the example illustrated in FIG. 2, system 200 includes one or more receiver devices 202A-202N, television service network 204, television service provider site 206, wide area network 212, one or more content provider sites 214A-214N, and one or more data provider sites 216A-216N. System 200 may include software modules. Software modules may be stored in a memory and executed by a processor. System 200 may include one or more processors and a plurality of internal and/or external memory devices. Examples of memory devices include file servers, file transfer protocol (FTP) servers, network attached storage (NAS) devices, local disk drives, or any other type of device or storage medium capable of storing data. Storage media may include Blu-ray discs, DVDs, CD-ROMs, magnetic disks, flash memory, or any other suitable digital storage media. When the techniques described herein are implemented partially in software, a device may store instructions for the software in a suitable, non-transitory computer-readable medium and execute the instructions in hardware using one or more processors.

System 200 represents an example of a system that may be configured to allow digital media content, such as, for example, a movie, a live sporting event, etc., and data, applications and media presentations associated therewith, to be distributed to and accessed by a plurality of computing devices, such as receiver devices 202A-202N. In the example illustrated in FIG. 2, receiver devices 202A-202N may include any device configured to receive data from television service provider site 206. For example, receiver devices 202A-202N may be equipped for wired and/or wireless communications and may include televisions, including so-called smart televisions, set top boxes, and digital video recorders. Further, receiver devices 202A-202N may include desktop, laptop, or tablet computers, gaming consoles, mobile devices, including, for example, "smart" phones, cellular telephones, and personal gaming devices configured to receive data from television service provider site 206. It should be noted that receiver devices 202A-202N may include combinations of primary devices and companion devices. For example, a receiver device may include a primary device including a digital television and a companion device including a tablet computer. Thus, in some examples, multimedia presentations may be rendered on a primary device and an application based feature may be executed on a companion device. It should be noted that although system 200 is illustrated as having distinct sites, such an illustration is for descriptive purposes and does not limit system 200 to a particular physical architecture. Functions of system 200 and sites included therein may be realized using any combination of hardware, firmware and/or software implementations.

Television service network 204 is an example of a network configured to enable digital media content, which may include television services, to be distributed. For example, television service network 204 may include public over-the-air television networks, public or subscription-based satellite television service provider networks, and public or subscription-based cable television provider networks and/or over the top or Internet service providers. It should be noted that although in some examples television service network 204 may primarily be used to enable television services to be provided, television service network 204 may also enable other types of data and services to be provided according to any combination of the telecommunication protocols described herein. Further, it should be noted that in some examples, television service network 204 may enable two-way communications between television service provider site 206 and one or more of receiver devices 202A-202N. Television service network 204 may comprise any combination of wireless and/or wired communication media. Television service network 204 may include coaxial cables, fiber optic cables, twisted pair cables, wireless transmitters and receivers, routers, switches, repeaters, base stations, or any other equipment that may be useful to facilitate communications between various devices and sites. Television service network 204 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 2, television service provider site 206 may be configured to distribute television service via television service network 204. For example, television service provider site 206 may include one or more broadcast stations, a cable television provider, or a satellite television provider, or an Internet-based television provider. In the example illustrated in FIG. 2, television service provider site 206 includes service distribution engine 208 and database 210. Service distribution engine 208 may be configured to receive data, including, for example, multimedia content and interactive applications and distribute data to receiver devices 202A-202N through television service network 204. For example, service distribution engine 208 may be configured to transmit television services according to aspects of the one or more of the transmission standards described above (e.g., an ATSC standard). In one example, service distribution engine 208 may be configured to receive data through one or more sources. For example, television service provider site 206 may be configured to receive a transmission including television programming through a satellite uplink and/or downlink. Further, as illustrated in FIG. 2, television service provider site 206 may be in communication with wide area network 212 and may be configured to receive data from content provider sites 214A-214N and further receive data from data provider sites 216A-216N. It should be noted that in some examples, television service provider site 206 may include a television studio and content may originate therefrom.

Database 210 may include storage devices configured to store data including, for example, multimedia content and data associated therewith, including for example, descriptive data and executable interactive applications. Data associated with multimedia content may be formatted according to a defined data format, such as, for example, HTML, Dynamic HTML, XML, and JavaScript Object Notation (JSON), and may include Universal Resource Identifiers (URIs) and Universal Resource Locators (URLs) enabling receiver devices 202A-202N to access data, e.g., from one of data provider sites 216A-216N. JSON is described in Internet Engineering Task Force (IETF): "The application/JSON Media Type for JavaScript Object Notation," Request for Comments (RFC) 4627, Internet Engineering Task Force, December 2011, which is incorporated by reference herein. In some examples, television service provider site 206 may be configured to provide access to stored multimedia content and distribute multimedia content to one or more of receiver devices 202A-202N through television service network 204. For example, multimedia content (e.g., music, movies, and television (TV) shows) stored in database 210 may be provided to a user via television service network 204 on a so-called on demand basis.

Wide area network 212 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3$^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 212 may comprise any combination of wireless and/or wired communication media. Wide area network 212 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 212 may include the Internet.

Referring again to FIG. 2, content provider sites 214A-214N represent examples of sites that may provide multimedia content to television service provider site 206 and/or receiver devices 202A-202N. For example, a content provider site may include a studio having one or more studio content servers configured to provide multimedia files and/or streams to television service provider site 206. In one example, content provider sites 214A-214N may be configured to provide multimedia content using the IP suite. For example, a content provider site may be configured to provide multimedia content to a receiver device according to Real Time Streaming Protocol (RTSP), Hypertext Transport Protocol (HTTP), or the like.

Data provider sites 216A-216N may be configured to provide data, including hypertext based content, and the like, to one or more of receiver devices 202A-202N and/or television service provider site 206 through wide area network 212. A data provider site 216A-216N may include one or more web servers. Data provided by data provider site 216A-216N may be defined according to data formats, such as, for example, HTML, Dynamic HTML, XML, and JSON. An example of a data provider site includes the United States Patent and Trademark Office website. It should be noted that in some examples, data provided by data provider sites 216A-216N may be utilized for application based features including, for example, so-called second screen applications. For example, companion device(s) in communication with a receiver device may display a website in conjunction with television programming being presented on the receiver device. It should be noted that data provided by data provider sites 216A-216N may include audio and video content.

Figure 3:
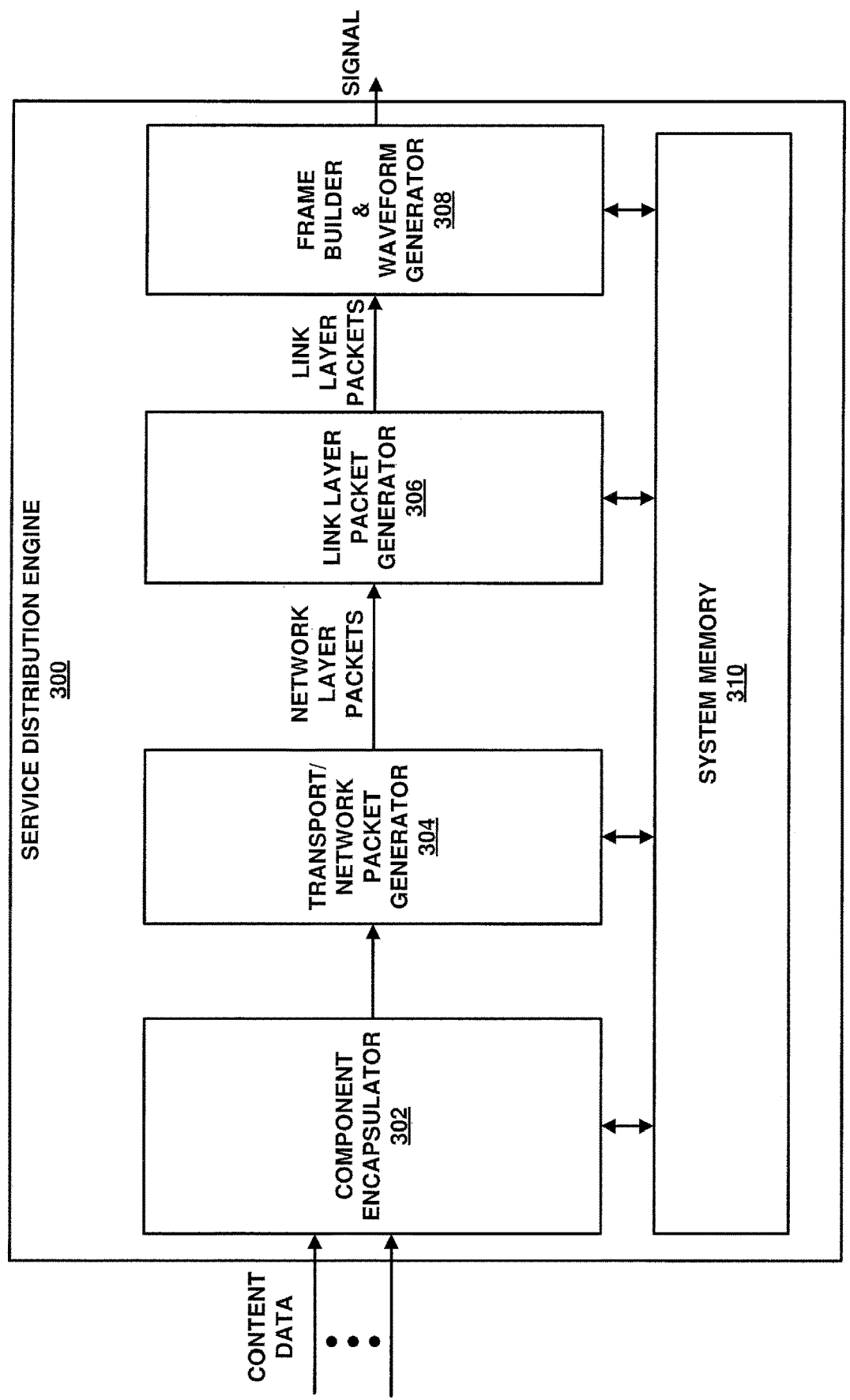
FIG. 3 is a block diagram illustrating an example of a service distribution engine that may implement one or more techniques of this disclosure.

As described above, service distribution engine 208 may be configured to receive data, including, for example, multimedia content and interactive applications and distribute data to receiver devices 202A-202N through television service network 204. FIG. 3 is a block diagram illustrating an example of a service distribution engine that may implement one or more techniques of this disclosure. Service distribution engine 300 may be configured to receive data and output a signal representing that data for distribution over a communication network, e.g., television service network 204. For example, service distribution engine 300 may be configured to receive one or more data streams and output a signal that may be transmitted using a single radio frequency band (e.g., a 6 MHz channel, an 8 MHz channel, etc.) or a bonded channel (e.g., two separate 6 MHz channels). A data stream may generally refer to data encapsulated in a set of one or more data packets. In one example, service distribution engine 300 may provide a set of services that include multimedia content and/or application based features to one or more receiver devices.

As illustrated in FIG. 3, service distribution engine 300 includes component encapsulator 302, transport/network packet generator 304, link layer packet generator 306, frame builder and waveform generator 308, and system memory 310. Each of component encapsulator 302, transport/network packet generator 304, link layer packet generator 306, frame builder and waveform generator 308, and system memory 310 may be interconnected (physically, communicatively, and/or operatively) for intercomponent communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although service distribution engine 300 is illustrated as having distinct functional blocks, such an illustration is for descriptive purposes and does not limit service distribution engine 300 to a particular hardware architecture. Functions of service distribution engine 300 may be realized using any combination of hardware, firmware and/or software implementations.

System memory 310 may be described as a non-transitory or tangible computer-readable storage medium. In some examples, system memory 310 may provide temporary and/or long-term storage. In some examples, system memory 310 or portions thereof may be described as non-volatile memory and in other examples portions of system memory 310 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. System memory 310 may be configured to store information that may be used by service distribution engine 300 during operation. It should be noted that system memory 310 may include individual memory elements included within each of component encapsulator 302, transport/network packet generator 304, link layer packet generator 306, and frame builder and waveform generator 308. For example, system memory 310 may include one or more buffers (e.g., First-in First-out (FIFO) buffers) configured to store data for processing by a component of service distribution engine 300.

Component encapsulator 302 may be configured to receive one or more components of a service and encapsulate the one or more components according to a defined data structure. For example, component encapsulator 302 may be configured to receive one or more media components and generate a package based on MMTP. Further, component encapsulator 302 may be configured to receive one or more media components and generate media presentation based on Dynamic Adaptive Streaming over HTTP (DASH). Further, component encapsulator 302 may be configured to generate and/or receive a collection of files forming a service provider application and package the files for distribution. For example, component encapsulator 302 may package the files for distribution via the ATSC 3.0 broadcast physical layer utilizing ROUTE. It should be noted that in some examples, component encapsulator 302 may be configured to generate service layer signaling data that enables a receiver device to locate and access a collection of files forming a service provider application. For example, component encapsulator 302 may be configured to signal URIs that a receiver device may use to download a service provider application. Transport/network packet generator 304 may be configured to receive a transport package and encapsulate the transport package into corresponding transport layer packets (e.g., UDP, Transport Control Protocol (TCP), etc.) and network layer packets (e.g., Ipv4, Ipv6, compressed IP packets, etc.). Link layer packet generator 306 may be configured to receive network packets and generate packets according to a defined link layer packet structure (e.g., an ATSC 3.0 link layer packet structure).

Frame builder and waveform generator 308 may be configured to receive one or more link layer packets and output symbols (e.g., orthogonal frequency division multiplexing (OFDM) symbols) arranged in a frame structure. As described above, a frame may include one or more PLPs may be referred to as a physical layer frame (PHY-Layer frame). In one example, a frame structure may include a bootstrap, a preamble, and a data payload including one or more PLPs. A bootstrap may act as a universal entry point for a waveform. A preamble may include so-called Layer-1 signaling (L1-signaling). L1-signaling may provide the necessary information to configure physical layer parameters. Frame builder and waveform generator 308 may be configured to produce a signal for transmission within one or more of types of RF channels: a single 6 MHz channel, a single 7 MHz channel, single 8 MHz channel, a single 11 MHz channel, and bonded channels including any two or more separate single channels (e.g., a 14 MHz channel including a 6 MHz channel and a 8 MHz channel). Frame builder and waveform generator 308 may be configured to insert pilots and reserved tones for channel estimation and/or synchronization. In one example, pilots and reserved tones may be defined according to an OFDM symbol and sub-carrier frequency map. Frame builder and waveform generator 308 may be configured to generate an OFDM waveform by mapping OFDM symbols to subcarriers. It should be noted that in some examples, frame builder and waveform generator 308 may be configured to support layer division multiplexing. Layer division multiplexing may refer to super-imposing multiple layers of data on the same RF channel (e.g., a 6 MHz channel). Typically, an upper layer refers to a core (e.g., more robust) layer supporting a primary service and a lower layer refers to a high data rate layer supporting enhanced services. For example, an upper layer could support basic High Definition video content and a lower layer could support enhanced Ultra-High Definition video content.

In this manner, service distribution engine 300 represents an example of a device configured to generate a signal including information that enables a receiver device to access a service provider application and/or a signal including one or more documents of a service provider application. In some examples, the execution of a service provider application may be based on one or more user settings. For example, one or more user settings may cause the way information and/or an application is rendered to change, cause an application to terminate, and/or cause an application not to launch. In one example, service distribution engine 300 may be configured to generate and/or distribute service provider applications that are configured to execute based on one or more user settings according to one or more techniques of this disclosure.

Figure 4:
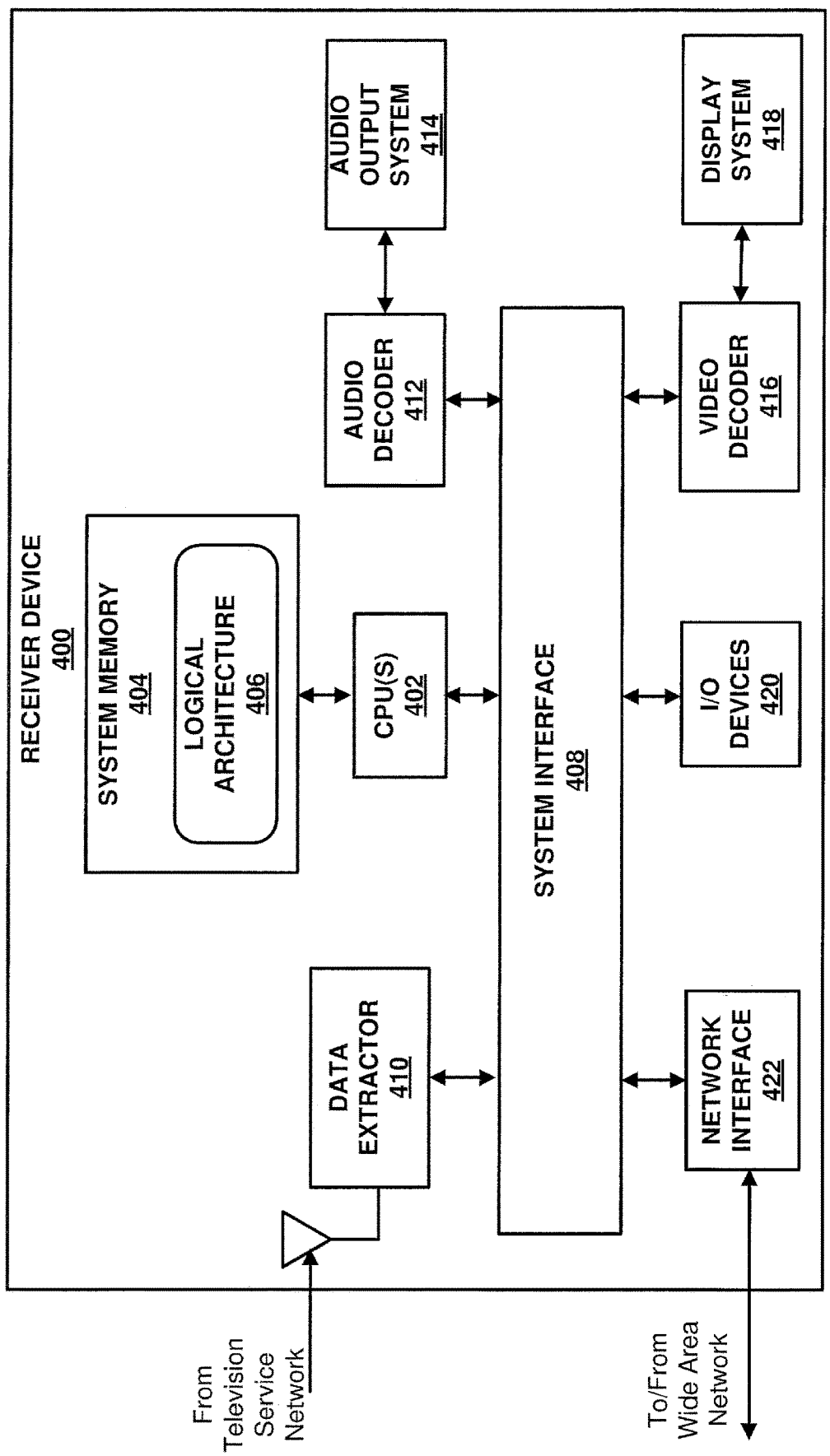
FIG. 4 is a block diagram illustrating an example of a receiver device that may implement one or more techniques of this disclosure.

FIG. 4 is a block diagram illustrating an example of a receiver device that may implement one or more techniques of this disclosure. Receiver device 400 is an example of a computing device that may be configured to receive data from a communications network and allow a user to access multimedia content, including interactive applications. Further, receiver device 400 may be configured to enable a user to change one or more user settings. For example, receiver device 400 may store user profile information and may be configured to enable a user to change settings included in a stored user profile, e.g., a language preference, etc. Further, receiver device 400 may be configured to enable a user to enable and/or disable a user setting during the operation of a receiver device (e.g., enabling and/or disabling close captioning). Receiver device 400 may be configured to enable service provider applications to execute based on one or more user settings according to one or more techniques of this disclosure.

In the example illustrated in FIG. 4, receiver device 400 is configured to receive data via a television network, such as, for example, television service network 204 described above. Further, in the example illustrated in FIG. 4, receiver device 400 is configured to send and receive data via a wide area network, for example, wide area network 212 described above. It should be noted that in other examples, receiver device 400 may be configured to simply receive data through a television service network. The techniques described herein may be utilized by devices configured to communicate using any and all combinations of communications networks.

As illustrated in FIG. 4, receiver device 400 includes central processing unit(s) 402, system memory 404, system interface 408, data extractor 410, audio decoder 412, audio output system 414, video decoder 416, display system 418, I/O device(s) 420, and network interface 422. As illustrated in FIG. 4, system memory 404 includes logical architecture 406. Each of central processing unit(s) 402, system memory 404, system interface 408, data extractor 410, audio decoder 412, audio output system 414, video decoder 416, display system 418, I/O device(s) 420, and network interface 422 may be interconnected (physically, communicatively, and/or operatively) for intercomponent communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although receiver device 400 is illustrated as having distinct functional blocks, such an illustration is for descriptive purposes and does not limit receiver device 400 to a particular hardware architecture. Functions of receiver device 400 may be realized using any combination of hardware, firmware and/or software implementations.

CPU(s) 402 may be configured to implement functionality and/or process instructions for execution in receiver device 400. CPU(s) 402 may include single and/or multi-core central processing units. CPU(s) 402 may be capable of retrieving and processing instructions, code, and/or data structures for implementing one or more of the techniques described herein. Instructions may be stored on a computer readable medium, such as system memory 404. System memory 404 may be described as a non-transitory or tangible computer-readable storage medium. In some examples, system memory 404 may provide temporary and/or long-term storage. In some examples, system memory 404 or portions thereof may be described as non-volatile memory and in other examples portions of system memory 404 may be described as volatile memory. System memory 404 may be configured to store information that may be used by receiver device 400 during operation. System memory 404 may be used to store program instructions for execution by CPU(s) 402 and may be used by programs running on receiver device 400 to temporarily store information during program execution. Further, in the example where receiver device 400 is included as part of a digital video recorder, system memory 404 may be configured to store numerous video files.

Logical Architecture 406 may include data structures that cause CPU(s) 402 of receiver device 400 to perform particular functions. Logical architecture 406 may include an operating system, drivers, software modules, application programming interfaces (APIs), applications, and the like. Logical architecture 406 may be configured to enable a user to access multimedia content, access interactive applications, and change one or more user settings. Components of logical architecture 406 may be implemented or contained within, operable by, executed by, and/or be operatively and/or communicatively coupled to components of receiver device 400 and may include algorithms which are expressed in computer programming statements, such as, for-loops, while-loops, if-statements, do-loops, etc. Logical architecture 406 may include components developed using a specified programming language, e.g., applications. Examples of programming languages include, Java™, Jini™, C, C++, Objective C, Swift, Perl, Python, PhP, UNIX Shell, Visual Basic, and Visual Basic Script. In the example where receiver device 400 includes a smart television, logical architecture 406 may include components developed by a television manufacturer. An operating system or conceptually similar component of logical architecture 406 may be configured to facilitate the interaction of applications with CPUs(s) 402 and other hardware components of receiver device 400. In one example, an operating system may be an operating system designed to be installed on set-top boxes, digital video recorders, televisions, and the like. Further, one or more APIs or conceptually similar components may be defined within logical architecture 406 to enable data to be accessible across multiple applications. It should be noted that in some examples logical architecture 406 may be referred to as a software stack. However, it should also be noted that techniques described herein may be utilized by devices configured to operate using any and all combinations of hardware and software architectures.

System interface 408 may be configured to enable communications between components of receiver device 400. In one example, system interface 408 comprises structures that enable data to be transferred from one peer device to another peer device or to a storage medium. For example, system interface 408 may include a chipset supporting Accelerated Graphics Port (AGP) based protocols, Peripheral Component Interconnect (PCI) bus based protocols, such as, for example, the PCI Express™ (PCIe) bus specification, which is maintained by the Peripheral Component Interconnect Special Interest Group, or any other form of structure that may be used to interconnect peer devices (e.g., proprietary bus protocols).

As described above, receiver device 400 is configured to receive and, optionally, send data via a television service network. As described above, a television service network may operate according to a telecommunications standard. A telecommunications standard may define communication properties (e.g., protocol layers), such as, for example, physical signaling, addressing, channel access control, packet properties, and data processing. In the example illustrated in FIG. 4, data extractor 410 may be configured to extract video, audio, and data from a signal. A signal may be defined according to, for example, aspects DVB standards, ATSC standards, ISDB standards, DTMB standards, DMB standards, and DOCSIS standards. Data extractor 410 may be configured to extract video, audio, and data, from a signal generated by service distribution engine 300 described above. That is, data extractor 410 may operate in a reciprocal manner to service distribution engine 300.

Data packets may be processed by CPU(s) 402, audio decoder 412, and video decoder 416. Audio decoder 412 may be configured to receive and process audio packets. For example, audio decoder 412 may include a combination of hardware and software configured to implement aspects of an audio codec. That is, audio decoder 412 may be configured to receive audio packets and provide audio data to audio output system 414 for rendering. Audio data may be coded using multi-channel formats such as those developed by Dolby and Digital Theater Systems. Audio data may be coded using an audio compression format. Examples of audio compression formats include Motion Picture Experts Group (MPEG) formats, Advanced Audio Coding (AAC) formats, DTS-HD formats, and Dolby Digital (AC-3) formats. Audio output system 414 may be configured to render audio data. For example, audio output system 414 may include an audio processor, a digital-to-analog converter, an amplifier, and a speaker system. A speaker system may include any of a variety of speaker systems, such as headphones, an integrated stereo speaker system, a multi-speaker system, or a surround sound system.

Video decoder 416 may be configured to receive and process video packets. For example, video decoder 416 may include a combination of hardware and software used to implement aspects of a video codec. In one example, video decoder 416 may be configured to decode video data encoded according to any number of video compression standards, such as ITU-T H.262 or ISO/IEC MPEG-2 Visual, ISO/IEC MPEG-4 Visual, ITU-T H.264 (also known as ISO/IEC MPEG-4 Advanced video Coding (AVC)), and High-Efficiency Video Coding (HEVC). Display system 418 may be configured to retrieve and process video data for display. For example, display system 418 may receive pixel data from video decoder 416 and output data for visual presentation. Further, display system 418 may be configured to output graphics in conjunction with video data, e.g., graphical user interfaces. Display system 418 may comprise one of a variety of display devices such as a liquid crystal display (LCD), a plasma display, an organic light emitting diode (OLED) display, or another type of display device capable of presenting video data to a user. A display device may be configured to display standard definition content, high definition content, or ultra-high definition content.

I/O device(s) 420 may be configured to receive input and provide output during operation of receiver device 400. That is, I/O device(s) 420 may enable a user to select multimedia content to be rendered, access an interactive application, and/or change a user setting. Input may be generated from an input device, such as, for example, a push-button remote control, a device including a touch-sensitive screen, a motion-based input device, an audio-based input device, or any other type of device configured to receive user input. I/O device(s) 420 may be operatively coupled to receiver device 400 using a standardized communication protocol, such as for example, Universal Serial Bus protocol (USB), Bluetooth, ZigBee or a proprietary communications protocol, such as, for example, a proprietary infrared communications protocol.

Network interface 422 may be configured to enable receiver device 400 to send and receive data via a local area network and/or a wide area network. Network interface 422 may include a network interface card, such as an Ethernet card, an optical transceiver, a radio frequency transceiver, or any other type of device configured to send and receive information. Network interface 422 may be configured to perform physical signaling, addressing, and channel access control according to the physical and Media Access Control (MAC) layers utilized in a network.

Figure 5:
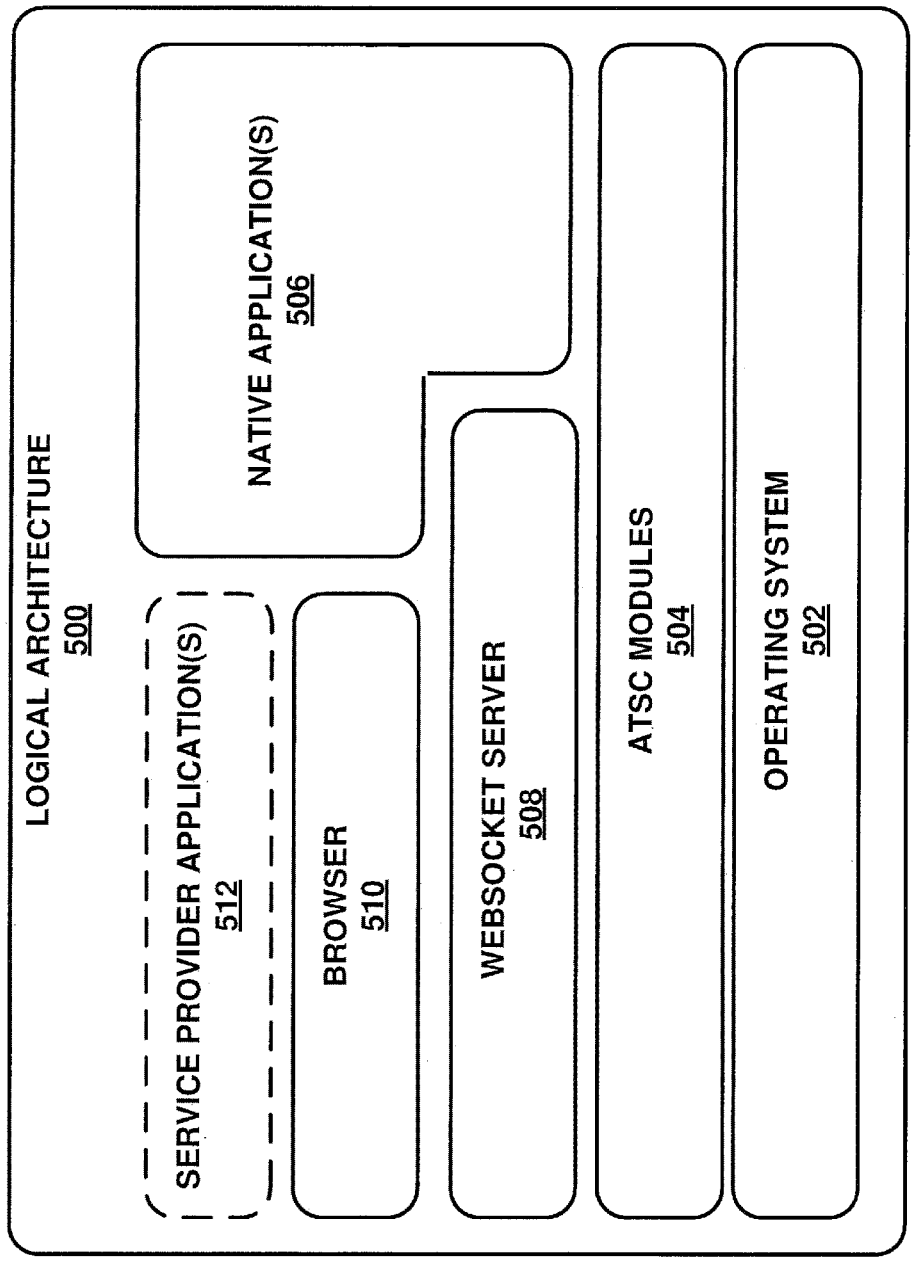
FIG. 5 is a block diagram illustrating an example of a logical architecture of a receiver device that may implement one or more techniques of this disclosure.

As described above, logical architecture 406 may be configured to enable a user to access multimedia content, access interactive applications, and change one or more user settings. FIG. 5 is a block diagram illustrating an example of a logical architecture of a receiver device that may implement one or more techniques of this disclosure. Logical architecture 500 may be configured to enable communication of user settings in conjunction with the execution of a service provider application according to one or more techniques of this disclosure. Logical architecture 500 may enable one or more user settings and changes thereto to be communicated to a service provider application. That is, as described in further detail below, logical architecture 500 may provide messages that may be used for executing service provider applications based on one or more user settings. In some examples, the format of messages used may be referred to as application programming interfaces. Further, in some examples, messages used for inter-application communication may be referred to as abstractions. As described above, the execution of a service provider application may be based on one or more user settings. Further, logical architecture 500 may enable a receiver device to operate in compliance with the ATSC 3.0 suite of standards and enable functionality specified by the ATSC 3.0 suite of standards, including future variations thereof, such as, for example, collecting service and application signaling, downloading multimedia content packets and rendering the audio/video multimedia content, downloading and installing application packages, and executing downloaded applications.

As illustrated in FIG. 5, logical architecture 500 includes operating system 502, ATSC modules 504, native applications 506, websocket server 508, browser 510, and service provider applications 512. It should be noted that in some cases, servicer provider applications may be referred to as broadcaster applications or apps. In one example, operating system 502 may be configured to facilitate the interaction of ATSC modules 504, native applications 506, websocket server 508, browser 510, and service provider applications 512 with one another and/or hardware components of a receiver device. That is, ATSC modules 504, native applications 506, websocket server 508, browser 510, and service provider applications 512 may be said to run on top of operating system 502. It should be noted that in some cases a browser may be referred to as a user agent. In one example, a separate user agent may be present in the logical architecture. It should be noted, however, that components illustrated in FIG. 5 do not necessary need to use a component positioned below them in FIG. 5 to access other components in logical architecture 500. For example, in some cases, native applications 506 may access operating system 502 directly. Operating system 502 may include any operating system designed to be installed on set-top boxes, digital video recorders, televisions, and the like. In one example, components of the logical architecture 500 may reside on separate devices. For example, browser 510 and service provider application(s) 512 may reside on one device (e.g., a companion device) while websocket server 508, native application(s) 506, ATSC modules 504 and operating system 502 may reside on another device (e.g., a digital television). The two devices may communicate with each other for over a network, for example, over a local area network, using for example a websocket connection, HTTP connections, etc. In one example parts of the logical architecture may not be present, that is, for example, in some cases native application(s) 506 may not be present. In an example, different portions of components of logical architecture 500 may reside on different devices.

ATSC modules 504 may include any logical implementation that enables a receiver device to perform basic functionality associated with the ATSC 3.0 suite of standards. For example, ATSC modules 504 may include a service signaling manager configured to enable a receiver device to parse service signaling defined according to the ATSC 3.0 suite of standards, an application signaling manager may be configured to enable a receiver device to parse application signaling defined according to the ATSC 3.0 suite of standards, an application download manager may be configured to enable a receiver device to retrieve and/or store applications distributed according to the ATSC 3.0 suite of standards, a service resource manager may be configured to enable a receiver device to manager resources (e.g., one or more tuners) used to access data distributed according to the ATSC 3.0 suite of standards, and a media streaming engine may be configured to enable a receiver device to stream multimedia content according to the ATSC 3.0 suite of standards. Service signaling may be obtained from over-the-air (e.g., as specified in A/331) or from a server on a network (e.g., as specified in A/336: ATSC Candidate Standard, Content Recovery in Redistribution Scenarios, 15 Jan. 2016, which is incorporated by reference herein). In one example, a tuner (e.g., an ATSC 3.0 tuner) may be included as one of the ATSC modules. In another example, a separate logical entity tuner may be present.

Referring again to FIG. 5, logical architecture 500 includes browser 510 and service provider applications 512. Service provider applications 512 may include service provider applications enabling application based features provided in conjunction a multimedia presentation service, as described above, and may include HTML pages, JavaScript, CSS, XML, and/or multimedia files. In some cases, service provider applications 512 may include applications that are downloaded, executed, terminated, and deleted based on a multimedia presentation service. Browser 510 includes a logical structure that enables a receiver device to retrieve data using resource identifiers and/or cause retrieved data to be rendered. Browser 510 may include one or more web browsers. As described above, service provider applications 512 may include documents that generally corresponds website content. Thus, in some examples browser 510 may be configured to retrieve and execute servicer provider applications 512. That is, service provider application 512 may be said to operate within browser 510. As described in further detail below, browser 510 may be configured to enable service provider applications 512 to execute based on one or more user settings according to one or more techniques of this disclosure. In some cases service provider applications 512 may make use of only browser (user agent) capabilities like HTML (e.g. HTML5), scripting (e.g. JavaScript), XML, ATSC-specific extensions and/or APIs, etc., to perform its desired operations.

Referring again to FIG. 5, native applications 506 may include any type of application that provides functionality in a receiver device. As described above, in some cases, service provider applications 512 may include applications that are downloaded, executed, terminated, and deleted based on a multimedia presentation service. It should be noted that native applications 506 and service provider applications 512 may be distinguished based on native applications 506 being generally applicable to the operation of a receiver device and service provider applications 512 being more specifically applicable to a received and/or rendered service. For example, native applications 506 may provide basic functionality with respect to a receiver device and may include, for example, a set-up wizard application, navigational applications (e.g., electronic program guide applications), user profile applications, and the like. In some cases, aspects of native applications 512 may operate independently of a service currently being rendered. In some cases native applications 506 may be distinguished from service provider applications 512 based on their ability to make use of device-specific capabilities to perform a desired operation. In some cases, service provider applications 512 may have been downloaded from a service. In some cases, native applications 506 may be installed by default by the device manufacturer on the device.

In one example, native applications 506 may include applications that enable a user to change one or more user settings. For example, native applications 506 may include applications that enable a user to change settings included in a stored user profile and/or applications that enable a user to enable and/or disable a user setting in conjunction with the rendering of multimedia data, e.g., native applications 506 may enable a user to select an audio component for a television program. In one example, native applications 506 may cause a change to a user setting to be stored to a system memory of a receiver device (e.g., system memory 404).

Figure 6:
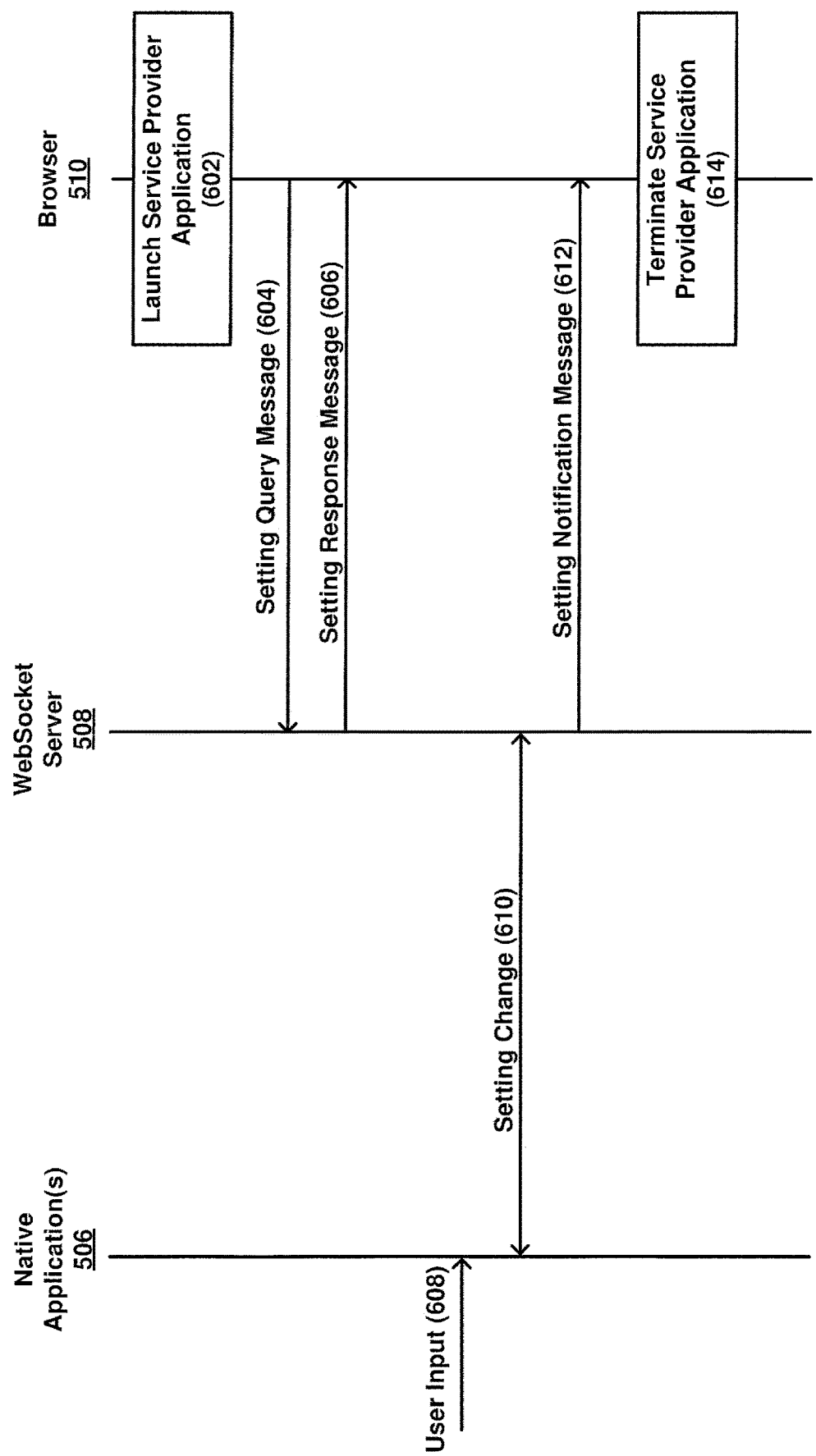
FIG. 6 is a conceptual diagram illustrating an example of a communications flow according to one or more techniques of this disclosure.

As illustrated in FIG. 5, logical architecture 500 includes websocket server 508. Websocket server 508 represents an abstraction that enables user settings to be communicated to browser 510 and as such, enables browser 510 to enable service provider applications 512 to execute based on one or more user settings. For example, referring to FIG. 6, FIG. 6 is a conceptual diagram illustrating an example of a communications flow of user settings to a browser according to one or more techniques of this disclosure. That is, FIG. 6 illustrates an example where a receiver device stores user settings, which may be changed in response to user input, and a service provider application executes based on user settings. In the example, in FIG. 6, browser 510 launches a service provider application (602). Service provider application running in browser 510 sends a setting query message (604) to websocket server 508 and websocket server 508 provides a setting response message (606). For example, browser 510 may query a language preference user setting in order to enable a service provider application to execute based on a language preference. Examples of setting query messages and setting response messages are described in greater detail below.

Further, as illustrated in FIG. 6, native applications 506 may receive user input (608), which may include a change to a user setting. Websocket server 508 may receive a setting change (610). For example, websocket server 508 may poll a data structure of a system memory of a receiver device to determine if a change to a user setting occurs. In the example illustrated in FIG. 6, websocket server 508 sends a setting notification message to service provider application running in browser 510 in response to the setting change (612). In some cases, websocket server 508 sends a setting notification message to service provider application (602) running in browser 510 in response to the setting change (612) only if the service provider application (602) is subscribed to the notification. Examples of setting notification messages are described in greater detail below. In the example illustrated in FIG. 6, browser 510 causes the service provider application to terminate in response to the setting notification message (614). It should be noted that in other examples, browser 510 may cause other functionality to occur in service provider application in response to the setting notification message. In one example, the native application(s) 506 and webSocket Server 508 may form a single logical unit receiving user input (608), in which case a setting change does not have to be explicitly communicated to the webSocket Server 508.

In one example, websocket server 508 may include a bidirectional socket. It should be noted that in some cases, a side or endpoint of a bidirectional socket may be referred to as a terminal. An example of a bidirectional socket includes a bidirectional socket based on the WebSocket protocol, which is described in IETF: "The WebSocket Protocol," RFC 6455, Internet Engineering Task Force, December 2011, and The WebSocket API, World Wide Web Consortium (W3C) Candidate Recommendation, 20 Sep. 2012, each of which are respectively incorporated by reference herein. It should be noted that for the sake of brevity, the WebSocket Protocol is not described herein in its entirety. For example, details of handshakes and error handling according to the WebSocket Protocol are not described herein. However, it should be noted that a bidirectional socket based on the WebSocket protocol includes a bidirectional socket that enables character data encoded in Universal Transformation Format-8 (UTF-8) to be exchanged between a logical client and a logical server over TCP. Thus, in one example, browser 510 may act as a logical client and websocket server 508 may act as a logical server and browser 510 and websocket server 508 may exchange encoded character data over TCP.

Encoded character data may be formatted according to a defined data structure. One example of a defined data structure includes the JSON-RPC 2.0 Specification, Mar. 26, 2010, updated Jan. 4, 2013, which is incorporated by reference herein. JSON-RPC 2.0 is a stateless, light-weight remote procedure call (RPC) protocol that uses JSON as a data format. The JSON-RPC 2.0 Specification defines several data structures and the rules around their processing. The JSON-RPC 2.0 Specification is transport agnostic in that the concepts can be used within the same process, over sockets, over HTTP, or in many various message passing environments.

In one example, a receiver device, e.g., receiver device 400 may support the following types of communications between a logical client and a logical server:

A request message which may be used to request information or initiate an action;

A synchronous response message which may include a definitive answer to a request and which may be provided in an effectively immediate manner;

A asynchronous response message which may include a definitive answer to the request and which may be provided in an asynchronous manner;

An error response message which may include a definitive error to the request; and A notification message which may include a unidirectional notification. In some cases, no response is expected with a notification message.

In one example, a receiver device, e.g., receiver device 400 may support one or more of the following types of notification messages, for example, websocket server 508 may be configured to provide the following types of notifications to browser 510:

A parental rating level change notification—a notification that may be provided whenever the user changes the parental blocking level in the receiver, where a parental blocking level sets a maximum rating threshold of content that may be accessed.

A rating block change notification—a notification that may be provided whenever the user changes the parental blocking level in the receiver such that the currently decoding program (e.g., a television service currently being rendered) goes from blocked to unblocked, or unblocked to blocked.

A service change notification—a notification that may be provided if a different service is acquired due to user action.

A prepare to be terminated notification—a notification that may be provided just ahead of the time that the receiver will terminate the application, to allow the application to perform any shutdown operations (to save state, etc.).

A caption state change notification—a notification that may be provided whenever the user changes the state of closed caption display (either off to on, or on to off).

An aural/audio representation of emergency information state change notification—a notification that may be provided whenever the user changes the state of aural/audio representation of emergency information rendering (either off to on, or on to off). An example of an aural/audio representation of emergency information rendering includes an aural/audio representation of a so-called burned-in emergency message text crawl.

An audio dialog enhancement state change notification—a notification that may be provided whenever the user changes the state of audio dialog enhancement rendering (either off to on, or on to off).

A video description service state change notification—a notification that may be provided whenever the user changes the state of video descriptive service (either off to on, or on to off).

A closed signing service state change notification—a notification that may be provided whenever the user changes the state of closed signing service (either off to on, or on to off). Closed signing corresponds to visual language presentation that may be enabled or disabled by the user.

An accessibility preference change notification—a notification that may be provided whenever the user changes the preferred accessibility settings. In one example, accessibility settings may correspond to settings that assist a visually impaired or hearing impaired user access a service.

An audio accessibility preference change notification—a notification that may be provided whenever the user changes the preferred audio accessibility settings.

A language preference change notification—a notification that may be provided whenever the user changes the preferred language.

A personalization change notification—a notification that may be provided whenever the user changes any parameter that can be discovered.

As described above, in one example, a type of notification message may include an aural/audio representation of emergency information state change notification. It should be noted that in the examples below, "EI" in "audioEIState," "audioEIRender," "audioEI," "audioEIServiceLanguage," "audioEIService," and "audioEIEnabled" refers to emergency information. Thus, in some examples, "EI" may be specified as "EmergencyInformation" in the parameter definitions below. For example, "audioEmergnecyInformationService" may be used instead of "audioEIService." In one example, the format of an aural/audio representation of emergency information state change notification implemented based on the JSON-RPC 2.0 Specification may be defined as follows:

```
method: "org.atsc.notify"
params: A JSON object consisting of a key named msgType with value
    "audioEIState" and a key named "audioEIRender" with a Boolean value
    representing the new state of audio/aural representation of emergency
    information rendering.
params JSON Schema:
    {
      "type": "object",
      "properties": {
        "msgType": {"type": "string", "enum": ["audioEIState"]},
        "audioEIRender": {"type": "boolean"}
      },
      "required": ["msgType","audioEIRender"]
    }
```

It should be noted that with respect to the example aural/audio representation of emergency information state change notification, no reply is expected in response to this notification, and hence the "id" term is omitted. According to the example aural/audio representation of emergency information state change notification, in one example, websocket server 508 may notify browser 510 that an automatic rendering of aural/audio representation of emergency information has been turned on by sending the following message payload:

```
{
    "jsonrpc": "2.0",
    "method": "org.atsc.event.notify",
    "params": {
       "msgType": "audioEIState",
       "audioEIRender": true
    }
}
```

As described above, in one example, a type of notification message may include an audio dialog enhancement state notification. In one example, the format of an audio dialog enhancement state notification implemented based on the JSON-RPC 2.0 Specification may be defined as follows:

```
method: "org.atsc.notify"
params: A JSON object consisting of a key named msgType with value
"audioDialogEnhancementState" and a key named
"audioDialogEnhancementRender" with a Boolean value representing the
new state of audio dialog enhancement rendering.
params JSON Schema:
{
  "type": "object",
  "properties": {
    "msgType": {"type": "string",
      "enum": ["audioDialogEnhancementState"]},
    "audioDialogEnhancementRender": {"type": "boolean"}
  },
  "required": ["msgType","audioDialogEnhancementRender"]
}
```

It should be noted that with respect to the example audio dialog enhancement state notification, no reply is expected in response to this notification, hence the "id" term is omitted. According to the example audio dialog enhancement state notification, in one example, websocket server 508 may notify browser 510 that an audio dialog enhancement has been turned on by sending the following message payload:

```
{
    "jsonrpc": "2.0",
    "method": "org.atsc.event.notify",
    "params": {
       "msgType": "audioDialogEnhancementState",
       "audioDialogEnhancementRender": true
    }
}
```

As described above, in one example, a type of notification message may include a video description service state change notification. In one example, the format of a video description service state change notification implemented based on the JSON-RPC 2.0 Specification may be defined as follows:

```
method: "org.atsc.notify"
params: A JSON object consisting of a key named msgType with value
"videoDescriptionServiceState" and a key named "vdsRender" with a
Boolean value representing the new state of video description service
rendering.
params JSON Schema:
{
   "type": "object",
   "properties": {
     "msgType": {"type": "string",
       "enum": ["videoDescriptionServiceState"]},
     "vdsRender": {"type": "boolean"}
   },
   "required": ["msgType","vdsRender"]
}
```

It should be noted that with respect to the example video description service state change notification, no reply is expected in response to this notification, hence the "id" term is omitted. According to the example video description service state change notification, in one example, websocket server 508 may notify browser 510 that video descriptive service rendering has been turned on by sending the following message payload:

```
{
    "jsonrpc": "2.0",
    "method": "org.atsc.event.notify",
    "params": {
       "msgType": "videoDescriptionServiceState",
       "vdsRender": true
    }
}
```

It should be noted that in some examples, a type of notification message may include multiple optional and/or required parameters (or keys). For example, each of the example aural/audio representation of emergency information state change notification, audio dialog enhancement state notification, and video description service state change notification may in some examples include a closed caption and/or a closed signing parameter (e.g., a Boolean value indicating the state of closed caption display), which may be optionally signaled. Further, in one example, a single message format may be defined to indicate a change to any one of: "audioEIRender" "audioDialogEnhancementRender" and "vdsRender."

As described above, in one example, a type of notification message may include an audio accessibility preference change notification. In one example, the format of an audio accessibility preference change notification implemented based on the JSON-RPC 2.0 Specification may be defined as follows:

```
method: "org.atsc.notify"
params: A JSON object consisting of a key named msgType with value
    "accessibilityPref" and one or more key-value pairs described below.
params JSON Schema:
    {
        "type": "object",
        "properties": {
            "msgType": {"type": "string", "enum": ["accessibilityPref"]},
            "audioEI": {"type": "boolean"},
            "audioEnhancedDialog": {"type": "boolean"},
            "videoDescriptionService": {"type": "boolean"}
        },
        "required": ["msgType"]
    }
```

Where audioEI, audioEnhancedDialog, videoDescriptionService may be based on the following definitions and at least one key out of audioEI, audioEnhancedDialog, videoDescriptionService and its corresponding value shall be present in a message.

audioEI—a Boolean value representing the new state of audio/aural representation of emergency information rendering.

audioEnhancedDialog—a Boolean value representing the new state of audio enhanced dialog rendering.

videoDescriptionService—a Boolean value representing the new state of video description service (VDS) rendering.

It should be noted that with respect to the example audio accessibility preference change, no reply is expected in response to this notification, hence the "id" term is omitted. According to the example audio accessibility preference change, in one example, websocket server 508 may notify browser 510 that an automatic rendering of aural/audio representation of emergency information has been turned on by sending the following message payload:

```
{
    "jsonrpc": "2.0",
    "method": "org.atsc.notify",
    "params": {
        "msgType": "accessibilityPref",
        "audioEI": "true"}
    }
}
```

Further, in one example, the format of an audio accessibility preference change notification implemented based on the JSON-RPC 2.0 Specification may be defined as follows:

```
method: "org.atsc.notify"
params: A JSON object consisting of a key named msgType with value
    "audioAccessibilityPref" and one or more key-value pairs described
    below.
params JSON Schema:
{
    "type": "object",
    "properties": {
        "msgType": {"type": "string", "enum": ["audioAccessibilityPref"]},
        "videoDescriptionService": {"type": "boolean"},
        "videoDescriptionServiceLanguage": {"type": "string"},
        "audioEI": {"type": "boolean"},
        "audioEIServiceLanguage": {"type": "string"}
    },
    "required": ["msgType"], "minProperties": 2
}
```

Where videoDescriptionService, videoDescriptionServiceLanguage, audioEI, and audioEIServiceLanguage may be based on the following definitions and at least one key out of audioEI and videoDescriptionService and its corresponding value shall be present in a message.

videoDescriptionService—a Boolean value representing the new state of video description service (VDS) rendering.

videoDescriptionServiceLanguage—a string indicating the preferred language of VDS rendering, coded according to RFC 5646 [IETF: "Tags for Identifying Languages," RFC 5646, Internet Engineering Task Force, September 2009]. This property shall be present in the notification when videoDescriptionService is equal to true and the preferred language of VDS rendering is available.

audioEI—a Boolean value representing the new state of audio/aural representation of emergency information rendering.

audioEIServiceLanguage—a string indicating the preferred language of audio/aural representation of emergency information rendering, coded according to RFC 5646. This property shall be present in the notification when audioEI is equal to true and the preferred language of audio/aural representation of emergency information rendering is available.

It should be noted that with respect to the example audio accessibility preference change, no reply is expected in response to this notification, hence the "id" term is omitted. Further, it should be noted that in one example, availability of information (e.g., a preferred language) may be based on one or more of information being accessible (e.g., due to security settings, due to a data structure being locked, a timeout occurring, etc.) and/or being determinable (e.g., a user may have not set a value for a preference and/or a device may not enable a user to set a preference, etc.). According to the example audio accessibility preference change, in one example, websocket server 508 may notify browser 510 that a user has changed a video descriptor service's accessibility preference to enabled by sending the following message payload:

```
{
    "jsonrpc": "2.0",
    "method": "org.atsc.notify",
    "params": {
        "msgType": "accessibilityPref",
        "videoDescriptorService": "true"
        "videoDescriptorServiceLanguage": "en"}
    }
}
```

Further, in one example, the format of an audio accessibility preference change notification implemented based on the JSON-RPC 2.0 Specification may be defined as follows:

```
method: "org.atsc.notify"
params: A JSON object consisting of a key named msgType with value
    "audioAccessibilityPref" as described below.
params JSON Schema:
    {
        "type": "object",
        "properties": {
            "msgType": {"type": "string", "enum":
                ["audioAccessibilityPref"]},
            "videoDescriptionService": {
                "type": "object",
                "properties": {
                    "enabled": {"type": "boolean"},
                    "language": {"type": "string"}
```

```
        },
            "required": ["enabled"]
        },
        "audioEIService": {
            "type": "object",
            "properties": {
                "enabled": {"type": "boolean"},
                "language": {"type": "string"}
            },
            "required": ["enabled"]
        }
    },
    "required": ["msgType"], "minProperties": 2
}
```

Where videoDescriptionService.enabled, videoDescriptionService.language, audioEIService.enabled, and audioEI.language may be based on the following definitions:
- videoDescriptionService.enabled—a Boolean value representing the new state of video description service (VDS) rendering.
- videoDescriptionService.language—a string indicating the preferred language of VDS rendering, coded according to RFC 5646. This property shall be present in the notification when videoDescriptionService.enabled is equal to true and the preferred language of VDS rendering is available.
- audioEIService.enabled—a Boolean value representing the new state of audio/aural representation of emergency information rendering.
- audioEIService.language—a string indicating the preferred language of audio/aural representation of emergency information rendering, coded according to RFC 5646. This property shall be present in the notification when audioEIService.enabled is equal to true and the preferred language of audio/aural representation of emergency information rendering is available.

It should be noted that x.y above represents property y of object x.

According to the example audio accessibility preference change notification, in one example, websocket server 508 may notify browser 510 that a user has changed a video descriptor service's accessibility preference to enabled by sending the following message payload:

```
{
    "jsonrpc": "2.0",
    "method": "org.atsc.notify",
    "params": {
        "msgType": "accessibilityPref",
        "videoDescriptorService": {
            "enabled": true,
            "language": "en"
        }
    }
}
```

In one case, it may be beneficial to include with a state change to a specific value, additional information within a notification message. In one example, when video description service is turned ON by the user then the corresponding notification message may include the preferred user language setting for video description service (if the user setting is present). This information may help a service provider application to make the appropriate adaptation and removes the need for a separate query request to obtain the information. In one example, when audio/aural representation of emergency information is turned ON by the user then the corresponding notification message may include the preferred user language setting for audio/aural representation of emergency information (if the user setting is present). This information would help a service provider application to make the appropriate adaptation and removes the need for a separate query request to obtain the information. In one example, when closed signing is turned ON by the user then the corresponding notification message may include the preferred user language setting for closed signing (if the user setting is present). This information would help a service provider application to make the appropriate adaptation and removes the need for a separate query request to obtain the information.

Further, in one example, the format of an audio accessibility preference change notification implemented based on the JSON-RPC 2.0 Specification may be defined as follows:

```
method: "org.atsc.notify"
params: A JSON object consisting of a key named msgType with value
        "audioAccessibilityPref" as described below.
params JSON Schema:
{
    "type": "object",
    "properties": {
        "msgType": {"type": "string", "enum":
            ["audioAccessibilityPref"]},
        "videoDescriptionService": {
            "type": "object",
            "properties": {
                "enabled": {"type": "boolean"},
                "language": {"type": "string"}
            },
            "required": ["enabled"]
        },
        "audioEIService": {
            "type": "object",
            "properties": {
                "enabled": {"type": "boolean"},
                "language": {"type": "string"}
            },
            "required": ["enabled"]
        },
        "enhancedDialogEnabled": {"type": "boolean"},
    },
    "required": ["msgType"], "minProperties": 2
}
```

Where videoDescriptionService.enabled, videoDescriptionService.language, audioEIService.enabled, audioEI.language, and enhancedDialogEnabled may be based on the following definitions:
- videoDescriptionService.enabled—a Boolean value representing the new state of video description service (VDS) rendering.
- videoDescriptionService.language—a string indicating the preferred language of VDS rendering, coded according to RFC 5646. This property shall be present in the notification when videoDescriptionService.enabled is equal to true and the preferred language of VDS rendering is available.
- audioEIService.enabled—a Boolean value representing the new state of audio/aural representation of emergency information rendering.
- audioEIService.language—a string indicating the preferred language of audio/aural representation of emergency information rendering, coded according to RFC 5646. This property shall be present in the notification when audioEIService.enabled is equal to true and the preferred language of audio/aural representation of emergency information rendering is available.

enhancedDialogEnabled—a Boolean value representing the new state of user preference for enhanced dialog rendering.

It should be noted that x.y above represents property y of object x.

It should be noted that an enhanced dialog rendering may include a rendering that enhances dialog intelligibility and as such, a user setting may indicate that the user desires that available enhanced dialog rendering be enabled. For example, a television program may include a main audio track (e.g., a track including a mix of background music, dialog, and background noise) and/or separate audio tracks for each component, e.g., a dedicated dialog track. An enhancement of dialog may cause the volume of the dialog track to be increased relative to other audio tracks (additionally or alternatively the volume of other tracks may be decreased). Audio mixing techniques may be used to change the volume of respective audio components included in a single track and/or included in multiple tracks.

It should be noted that in some examples, "enhancedDialogEnabled" may be represented in the audio accessibility preference notification above by an object as follows:

```
...
"enhancedDialog": {
    "type": "object",
    "properties": {
        "enabled": {"type": "boolean"},
    },
    "required": ["enabled"]
},
...
```

Where enhancedDialog.enabled may be based on the following definition:
 enhancedDialog.enabled—a Boolean value representing the new state of user preference for enhanced dialog rendering.

As described above, a receiver device, e.g., receiver device 400 may enable user settings to be communicated using request and response mechanisms. In one example, websocket server 508 may be configured to provide responses to browser 510 based on one or more defined requests. It should be noted one or more of the types of notifications described above may be signaled using request and response messages. In one example, a receiver device, may support one or more of the following types of request messages and a corresponding response message:

A parental rating request—a request for the current parental blocking level in the receiver.

A caption state request—a request for the current state of closed caption display (either off to on, or on to off).

An aural/audio representation of emergency information state request—a request for the current state of aural/audio representation of emergency information rendering (either off to on, or on to off).

An audio dialog enhancement state request—a request for the current state of the state of audio dialog enhancement rendering (either off to on, or on to off).

A video description service state request—a request for the current state of the state of video descriptive service (either off to on, or on to off).

A closed signing service state request—a request for the current state of closed signing service (either off to on, or on to off).

An accessibility preference request—a request for the current the preferred accessibility settings.

An audio accessibility preference request—a request for the current preferred audio accessibility settings.

A language preference request—a request for the current preferred language.

A personalization setting request—a request for any parameter that can be discovered.

As described above, in one example, a type of request message may include an aural/audio representation of emergency information state request. In one example, the format of an aural/audio representation of emergency information state request and corresponding response implemented based on the JSON-RPC 2.0 Specification may be defined as follows:

```
method: "org.atsc.query.audioEI"
    params: Omitted
Response:
    result: a JSON object containing a audioEIEnabled key-value pair.
    result JSON Schema:
        {
            "type": "object",
            "properties": {
                "audioEIEnabled": {"type": "boolean"}
            },
            "required": ["audioEIEnabled"]
        }
```

Where audioEIEnabled may be based on the following definition:
 audioEIEnabled: This required boolean shall indicate true if aural/audio representation of emergency information rendering is currently enabled by the user, and false otherwise According to the example aural/audio representation of emergency information state request, in one example, browser 510 may request an aural/audio representation of emergency information state by sending the following message payload:

```
{
    "jsonrpc": "2.0",
    "method": "org.atsc.query.audioEI",
    "id": 52
}
``` and websocket server 508 may respond to the request by sending the following message payload:

```
{
    "jsonrpc": "2.0",
    "result": {"audioEIEnabled": true},
    "id": 52
}
```

It should be noted that the value of "id" fields in both the request and response may be identical to enable a service provider application to associate the two.

As described above, in one example, a type of request message may include an audio dialog enhancement state request. In one example, the format of an audio dialog enhancement state request and corresponding response implemented based on the JSON-RPC 2.0 Specification may be defined as follows:

```
method: "org.atsc.query.audioDialogEnhancement"
params: Omitted
Response:
    result: a JSON object containing a audioDialogEnhancementEnabled
        key-value pair.
    result JSON Schema:
        {
            "type": "object",
            "properties": {
                "audioDialogEnhancementEnabled": {"type":
                    "boolean"}
            },
            "required": ["audioDialogEnhancementEnabled"]
        }
```

Where audioDialogEnhancementEnabled may be based on the following definition:

audioDialogEnhancementEnabled: This required boolean shall indicate true if audio dialog enhancement rendering is currently enabled by the user, and false otherwise According to the example audio dialog enhancement state request, in one example, browser 510 may request an audio dialog enhancement state by sending the following message payload:

```
{
    "jsonrpc": "2.0",
    "method": "org.atsc.query.audioDialogEnhancement",
    "id": 49
}
``` and websocket server 508 may respond by sending the following message payload:

```
{
    "jsonrpc": "2.0",
    "result": {"audioDialogEnhancementEnabled": true},
    "id": 49
}
```

As described above, in one example, a type of request message may include a video description service state request. In one example, the format of a video description service state request and corresponding response implemented based on the JSON-RPC 2.0 Specification may be defined as follows:

```
method: "org.atsc.query.vds"
params: Omitted
Response:
    result: a JSON object containing a vdsEnabled key-value pair.
    result JSON Schema:
        {
            "type": "object",
            "properties": {
                "vdsEnabled": {"type": "boolean"}
            },
            "required": ["vdsEnabled"]
        }
```

Where vdsEnabled may be based on the following definition:

vdsEnabled: This required boolean shall indicate true if video description service rendering is currently enabled by the user, and false otherwise.

According to the example a video description service state request, in one example, browser 510 may request a video description service state by sending the following message payload:

```
{
    "jsonrpc": "2.0",
    "method": "org.atsc.query.vds",
    "id": 49
}
``` and websocket server 508 may respond by sending the following message payload:

```
{
    "jsonrpc": "2.0",
    "result": {"vdsEnabled": true},
    "id": 49
}
```

It should be noted that in some examples, a type of response message may include multiple optional and/or required parameters (or keys). For example, each of the example aural/audio representation of emergency information state response, audio dialog enhancement state response, and video description service state responses could including a closed caption and/or a closed signing parameter (e.g., a Boolean value indicating the state of closed caption display), which may be optionally signaled. Further, in one example, a single message format may be defined to indicate the state of any one of: "audioEIEnabled" "audioDialogEnhancementEnabled" and "vdsEnabled."

As described above, in one example, a type of request message may include an accessibility preference request. In one example, the format of an accessibility preference request and corresponding response implemented based on the JSON-RPC 2.0 Specification may be defined as follows:

```
method: "org.atsc.query.accessibilityServices"
params: Omitted
Response:
    result: a JSON object containing key-value pairs for ccEnabled,
        audioEIenabled, audioDialogEnhacementEnabled, and vdsEnabled
        containing a vdsEnabled key-value pair.
    result JSON Schema:
        {
            "type": "object",
            "properties": {
                "ccEnabled": {"type" : "boolean"},
                "audioEIEnabled": {"type" : "boolean"},
                "audioDialogEnhancementEnabled": {"type":
                    "boolean"},
                "vdsEnabled": { "type": "boolean" }
            },
            "required": ["ccEnabled" , "audioEIEnabled",
                "audioDialogEnhancementEnabled", "vdsEnabled"]
        }
```

Where ccEnabled, audioEIEnabled, audioDialogEnhancementEnabled, and vdsEnabled may be based on the following definitions:

ccEnabled: This required boolean shall indicate true if closed captions are currently enabled by the user, and false otherwise.

audioEIEnabled: This required boolean shall indicate true if aural/audio representation of emergency information rendering is currently enabled by the user, and false otherwise.

audioDialogEnhancementEnabled: This required boolean shall indicate true if audio dialog enhancement rendering is currently enabled by the user, and false otherwise.

vdsEnabled: This required boolean shall indicate true if video description service rendering is currently enabled by the user, and false otherwise.

According to the example accessibility preference request, in one example, browser 510 may request accessibility preferences by sending the following message payload:

```
{
    "jsonrpc": "2.0",
    "method": "org.atsc.query.accessibilityServices",
    "id": 49
}
``` and websocket server 508 may respond by sending the following message payload:

```
{
    "jsonrpc": "2.0",
    "result": {
        "ccEnabled" : true ,
        "audioEIEnabled" : true ,
        "audioDialogEnhancementEnabled" : false ,
        "vdsEnabled": false
    },
    "id": 49
}
```

As described above, in one example, a type of request message may include an audio accessibility request. In one example, the format of an audio accessibility preference request and corresponding response implemented based on the JSON-RPC 2.0 Specification may be defined as follows:

method: "org.atsc.query.audioAccessiblity"
params: Omitted
Response:
    result: a JSON object containing an object with three key-value pairs as defined below
    result JSON Schema:
```
{
    "type": "object",
    "properties": {
        "audioEIEnabled": {"type": "string", "enum": ["true","false","unknown"]},
        "audioEnhancedDialogEnabled": {"type": "string", "enum": ["true","false","unknown"]},
        "videoDescriptionServiceEnabled": {"type": "string", "enum": ["true","false","unknown"]}
    }
}
```

Where each of audioEIEnabled, audioDialogEnhancementEnabled, and videoDescriptorServicesEnabled may respectively indicate the current state of: automatic rendering preference of audio emergency information, audio enhanced dialog, and video description service. It should be noted that in some examples, "unknown" may not be present and the invocation may fail.

According to the example audio accessibility preference request, in one example, browser 510 may request audio accessibility preferences by sending the following message payload:

```
{
    "jsonrpc": "2.0",
    "method": "org.atsc.query.audioaccessibility",
    "id": 90
}
``` and websocket server 508 may respond by sending the following message payload:

```
{
    "jsonrpc": "2.0",
    "result": {
        "audioEIEnabled" : true,
        "audioEnhancedDialogEnabled" : false,
        " videoDescriptionServiceEnabled ": false
    },
    "id": 90
}
```

Further, in one example, the format of audio accessibility preference request and corresponding response implemented based on the JSON-RPC 2.0 Specification may be defined as follows:

method: "org.atsc.query.audioAccessiblity"
params: Omitted
Response:
    result: a JSON object containing an object with three key-value pairs as defined below.
    result JSON Schema:
```
{
    "type": "object",
    "properties": {
        "videoDescriptionServiceEnabled": {"type": "boolean"},
        "videoDescriptionServiceLanguage": {"type": "string"},
        "audioEIEnabled": {"type": "boolean"},
        "audioEIServiceLanguage": {"type": "string"}
    }
}
```

Where videoDescriptionServiceEnabled, videoDescriptionServiceLanguage, audioEIEnabled, and audioEILanguage may be based on the following definitions:

videoDescriptionServiceEnabled—a Boolean value representing the state of video description service (VDS) rendering.

videoDescriptionServiceLanguage—a string indicating the preferred language of VDS rendering, coded according to RFC 5646.

audioEIEnabled—a Boolean value representing the state of audio/aural representation of emergency information rendering.

audioEIServiceLanguage—a string indicating the preferred language of audio/aural representation of emergency information rendering, coded according to RFC 5646.

According to the example audio accessibility preference request, in one example, browser 510 may request audio accessibility preferences by sending the following message payload:

```
{
    "jsonrpc": "2.0",
    "method": "org.atsc.query.audioAccessibility",
    "id": 90
}
``` and if the user has set automatic rendering preference setting of video description service set to enable and rest of the settings are not available, websocket server 508 may respond by sending the following message payload:

```
{
  "jsonrpc": "2.0",
  "result": {
    " videoDescriptionServiceEnabled ": true
  },
  "id": 90
}
```

Further, in one example, the format of audio accessibility preference request and corresponding response implemented based on the JSON-RPC 2.0 Specification may be defined as follows:

```
        method: "org.atsc.query.audioAccessiblity"
        params: Omitted
Response:
        result: a JSON object containing an object as defined below.
        result JSON Schema:
            {
              "type": "object",
              "properties": {
                "videoDescriptionService": {
                  "type": "object",
                  "properties": {
                    "enabled": {"type": "boolean"},
                    "language": {"type": "string"}
                  }
                },
                "audioEIService": {
                  "type": "object",
                  "properties": {
                    "enabled": {"type": "boolean"},
                    "language": {"type": "string"}
                  }
                }
              }
            }
```

Where videoDescriptionService.enabled, videoDescriptionService.language, audioEIService.enabled, and audioEI.language may be based on the following definitions:

videoDescriptionService.enabled—a Boolean value representing the state of video description service (VDS) rendering.

videoDescriptionService.language—a string indicating the preferred language of VDS rendering, coded according to RFC 5646.

audioEIService.enabled—a Boolean value representing the state of audio/aural representation of emergency information rendering.

audioEIService.language—a string indicating the preferred language of audio/aural representation of emergency information rendering, coded according to RFC 5646.

Further, it should be noted that when a responding component does not have access to the setting corresponding to one of: videoDescriptionService.enabled, videoDescriptionService.language, audioEIService.enabled, or audioEI.language, then in may be expected that the response does not include the corresponding property. It should be noted that x.y above represents property y of object x.

According to the example audio accessibility preference request, in one example, browser 510 may request audio accessibility preferences by sending the following message payload:

```
{
  "jsonrpc": "2.0",
  "method": "org.atsc.query.audioAccessibility",
  "id": 90
}
``` and if the user has set automatic rendering preference setting of video description service set to enable and rest of the settings are not available, websocket server 508 may respond by sending the following message payload:

```
{
  "jsonrpc": "2.0",
  "result": {
    "videoDescriptionService": {
      "enabled": true
    }
  },
  "id": 90
}
```

Further, in one example, the format of audio accessibility preference request and corresponding response implemented based on the JSON-RPC 2.0 Specification may be defined as follows:

```
        method: "org.atsc.query.audioAccessiblity"
        params: Omitted
Response:
        result: a JSON object containing an object as defined below.
        result JSON Schema:
            {
              "type": "object",
              "properties": {
                "videoDescriptionService": {
                  "type": "object",
                  "properties": {
                    "enabled": {"type": "boolean"},
                    "language": {"type": "string"}
                  }
                },
                "audioEIService": {
                  "type": "object",
                  "properties": {
                    "enabled": {"type": "boolean"},
                    "language": {"type": "string"}
                  }
                },
                "enhancedDialogEnabled": {"type": "boolean"},
              }
            }
```

Where videoDescriptionService.enabled, videoDescriptionService.language, audioEIService.enabled, and audioEI.language may be based on the following definitions:

videoDescriptionService.enabled—a Boolean value representing the state of video description service (VDS) rendering.

videoDescriptionService.language—a string indicating the preferred language of VDS rendering, coded according to RFC 5646.

audioEIService.enabled—a Boolean value representing the state of audio/aural representation of emergency information rendering.

audioEIService.language—a string indicating the preferred language of audio/aural representation of emergency information rendering, coded according to RFC 5646.

enhancedDialogEnabled—a Boolean value representing the new state of user preference for enhanced dialog rendering.

It should be noted that when a responding component does not have access to the setting corresponding to one of: videoDescriptionService.enabled, videoDescriptionService.language, audioEIService.enabled, audioEI.language, or enhancedDialogEnabled then in may be expected that the response does not include the corresponding property. It should be noted that x.y above represents property y of object x.

According to the example audio accessibility preference request, in one example, browser 510 may request audio accessibility preferences by sending the following message payload:

```
{
    "jsonrpc": "2.0",
    "method": "org.atsc.query.audioAccessibility",
    "id": 90
}
``` and if the user has set automatic rendering preference setting of enhanced dialog set to enable and rest of the settings are not available, websocket server 508 may respond by sending the following message payload:

```
{
    "jsonrpc": "2.0",
    "result": {
        "enhancedDialogEnabled": true
    },
    "id": 90
}
```

It should be noted that in some examples, "enhancedDialogEnabled" may be represented in the audio accessibility preference response above by an object as follows:

```
...
"enhancedDialog": {
    "type": "object",
    "properties": {
        "enabled": {"type": "boolean"},
    },
    "required": ["enabled"]
},
...
```

Where enhancedDialog.enabled may be based on the following definition:

enhancedDialog.enabled—a Boolean value representing the new state of user preference for enhanced dialog rendering.

It should be noted that in some examples, if the requested user-setting is not present then the query invocation may fail and an appropriate error code is returned in response to the service provider application. It should be noted that in some examples, if the requested user-setting is not present then the receiver may pick an appropriate value and include it in query response to the service provider application. It should be noted that in some examples, if the requested user-setting is not present then the receiver may omit including the corresponding key value pair in query response to the service provider application.

It should be noted that in other examples other groupings of user settings may be defined and communicated using messages according to one or more of the techniques described herein. For example, settings related to closed captions, video descriptive services, audio representations of emergency information, settings related to dialog enhancements, settings related to content ratings, and settings related to language may be grouped as single query and/or notification. Further, groupings of user setting may be defined based one or more addition types of accessibility. For example, for each of hearing impaired accessibility and/or visual impaired accessibility there may be various defined types of accessibility.

It should be noted that in one example, defined notifications and queries may correspond to one another. For example, in one example, if a user setting property is not indicated a defined notification, then it may not be indicated in a corresponding query response. Likewise, in one example, if a user setting property is not indicated in a defined query response notification, then it may not be indicated in a corresponding notification.

In this manner, receiver device represents an example of a device configured to determine one or more user settings and cause application based features corresponding to a service provided by a service provider to execute based on one or more determined user settings.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:

1. A method for causing an application to execute based on one or more user settings, the method comprising:
    receiving a multimedia presentation service from a service provider;
    downloading a service provider application;
    enabling the service provider application to determine the one or more user settings, wherein the one or more user settings are set using a native application; and
    causing the service provider application to execute based on the one or more user settings, wherein causing the service provider application to execute includes causing application-based features to be provided in conjunction with the multimedia presentation service; wherein
    determining the one or more user settings includes:
        receiving a response message based on a query;
        determining a state of an audio representation of an emergency information rendering as enabled or disabled;
        determining a language preference of the audio representation of the emergency information;
        determining a state of a video descriptive service rendering as enabled or disabled; and
        determining a language preference of the video descriptive service, and
    the response message includes a first object containing a Boolean value indicating the state of the audio representation of the emergency information rendering and a string indicating the language preference of the audio representation of the emergency information, and a second object containing a Boolean value indicating the state of the video descriptive service and a string indicating the language preference of the video descriptive service.

2. The method of claim 1, wherein determining the one or more user settings includes polling a data structure storing user settings.

3. The method of claim 1, wherein determining the one or more user settings includes receiving a notification message indicating a change to a user setting.

4. The method of claim 3, further comprising causing an instance of the notification message to be sent to a companion device.

5. The method of claim 1, further comprising causing an instance of the response message to be sent to a companion device.

6. The method of claim 1, wherein the service provider application includes one or more of: Hypertext Markup Language (HTML) pages, JavaScript, Cascading Style Sheets (CSS), eXtensible Markup Language (XML), and multimedia files.

7. The method of claim 1, wherein the service provider includes a television service provider.

8. A device for causing an application to execute based on the one or more user settings, the device comprising one or more processors configured to perform the steps included in claim 1.

9. The device of claim 8, wherein the device includes a receiver device.

10. The device of claim 8, wherein the device is selected from a group consisting of: a desktop or laptop computer, a mobile device, a smartphone, a cellular telephone, a personal data assistant (PDA), a television, a tablet device, or a personal gaming device.

11. An apparatus for causing an application to execute based on the one or more user settings, the apparatus comprising means for performing the steps included in claim 1.

12. A non-transitory computer-readable storage medium having instructions that cause one or more processors of a device to perform the steps included in claim 1.

* * * * *